United States Patent
Azad

(10) Patent No.: US 9,061,911 B2
(45) Date of Patent: Jun. 23, 2015

(54) GRADIATOR REFORMER

(75) Inventor: Abdul-Majeed Azad, Perrysburg, OH (US)

(73) Assignee: The University of Toledo, Toledo, OH (US)

( * ) Notice: Subject to any disclaimer, the term of this patent is extended or adjusted under 35 U.S.C. 154(b) by 1171 days.

(21) Appl. No.: 12/996,854

(22) PCT Filed: Jun. 5, 2009

(86) PCT No.: PCT/US2009/046403
§ 371 (c)(1),
(2), (4) Date: Jan. 10, 2011

(87) PCT Pub. No.: WO2009/152050
PCT Pub. Date: Dec. 17, 2009

(65) Prior Publication Data
US 2011/0274991 A1    Nov. 10, 2011

Related U.S. Application Data

(60) Provisional application No. 61/059,989, filed on Jun. 9, 2008.

(51) Int. Cl.
*B01J 7/00* (2006.01)
*C01B 3/38* (2006.01)
(Continued)

(52) U.S. Cl.
CPC ............. *C01B 3/382* (2013.01); *B01J 8/0292* (2013.01); *B01J 8/0465* (2013.01); *B01J 8/0496* (2013.01); *B01J 20/0207* (2013.01); *B01J 20/0211* (2013.01); *B01J 20/06* (2013.01); *B01J 20/14* (2013.01); *B01J 20/18* (2013.01); *B01J 20/2803* (2013.01); *B01J 20/2808* (2013.01); *B01J 20/3204* (2013.01); *B01J 20/3236* (2013.01); *B01J 23/63* (2013.01); *B01J 23/64* (2013.01); *B01J 23/89* (2013.01); *B01J 35/006* (2013.01); *B01J 35/0066* (2013.01); *B01J 2208/00309* (2013.01); *B01J 2208/00522* (2013.01); *B01J 2208/0053* (2013.01); *B01J 2219/32286* (2013.01); *B01J 2219/32296* (2013.01);
(Continued)

(58) Field of Classification Search
CPC ................. C01B 2203/127; C01B 2203/0455; C01B 2203/0485; C01B 2203/1023; B01J 2208/025; B01J 2219/0004; B01J 2219/32425
See application file for complete search history.

(56) References Cited

U.S. PATENT DOCUMENTS 4,207,382 A    6/1980    Zaromb
5,938,800 A *    8/1999    Verrill et al. ................ 48/127.9
(Continued)

FOREIGN PATENT DOCUMENTS

EP      0359889 A1     3/1990

OTHER PUBLICATIONS

Azad, A.-M. et al., "Development of Ceria-Supported Sulfur Tolerant Nanocatalysts: Pd-Based Formulations," Applied Catalysis A: General, 2007, pp. 225-236, vol. 332.
(Continued)

*Primary Examiner* — Imran Akram
(74) *Attorney, Agent, or Firm* — MacMillan, Sobanski & Todd, LLC

(57) ABSTRACT

A desulfurizer-reformer reactor system comprising a gradient assembly having a de-sulfurizing material and a reforming catalyst material arranged in a sequential manner and methods of generating energy are disclosed.

10 Claims, 16 Drawing Sheets

(51) Int. Cl.
*B01J 8/02* (2006.01)
*B01J 8/04* (2006.01)
*B01J 20/02* (2006.01)
*B01J 20/06* (2006.01)
*B01J 20/14* (2006.01)
*B01J 20/18* (2006.01)
*B01J 20/28* (2006.01)
*B01J 20/32* (2006.01)
*B01J 23/63* (2006.01)
*B01J 23/64* (2006.01)
*B01J 23/89* (2006.01)
*B01J 35/00* (2006.01)

(52) U.S. Cl.
CPC ........ *B01J2219/32425* (2013.01); *C01B 3/384* (2013.01); *C01B 2203/0233* (2013.01); *C01B 2203/0244* (2013.01); *C01B 2203/066* (2013.01); *C01B 2203/0811* (2013.01); *C01B 2203/1023* (2013.01); *C01B 2203/1035* (2013.01); *C01B 2203/1064* (2013.01); *C01B 2203/107* (2013.01); *C01B 2203/1094* (2013.01); *C01B 2203/1258* (2013.01); *C01B 2203/127* (2013.01); *C01B 2203/86* (2013.01)

(56) References Cited

U.S. PATENT DOCUMENTS

| | | |
|---|---|---|
| 6,878,471 B1 | 4/2005 | Burch et al. |
| 6,920,920 B2 | 7/2005 | Whittenberger |
| 7,303,598 B1 * | 12/2007 | Namazian et al. .......... 48/197 R |
| 2002/0090328 A1 * | 7/2002 | Deshpande .................... 422/193 |
| 2002/0114747 A1 * | 8/2002 | Marchand et al. ............ 422/198 |
| 2004/0006914 A1 * | 1/2004 | Shaaban et al. ............. 48/197 R |
| 2004/0047799 A1 * | 3/2004 | Randhava et al. ............ 423/652 |
| 2004/0163311 A1 | 8/2004 | Ahmed et al. |
| 2005/0106428 A1 * | 5/2005 | Bolden .......................... 429/19 |
| 2005/0220703 A1 * | 10/2005 | Ihara et al. ................. 423/648.1 |
| 2006/0090398 A1 | 5/2006 | Katikaneni et al. |
| 2006/0213187 A1 | 9/2006 | Kupe et al. |
| 2008/0011646 A1 * | 1/2008 | Giroux et al. ................. 208/133 |
| 2009/0314682 A1 * | 12/2009 | Hunt et al. ...................... 208/95 |
| 2010/0015039 A1 * | 1/2010 | Doshi et al. .................. 423/652 |

OTHER PUBLICATIONS

Azad, A.-M. et al., "Development of Ceria-Supported Sulfur Tolerant Nanocatalysts: Rh-Based Formulations," Applied Catalysis A: General, 2007, pp. 77-88, vol. 330.

Azad, A.-M. et al., "Performance of Sulfur-Tolerant Reforming Catalysts for Production of Hydrogen from Jet Fuel Stimulants," Energy and Fuels, 2007, pp. 3513-3519, vol. 21.

PCT International Preliminary Report on Patentability, PCT/US2009/046403 filed Jun. 5, 2009, dated Dec. 23, 2010.

PCT International Search Report and the Written Opinion, PCT/US2009/046403 filed Jun. 5, 2009, dated Jul. 28, 2009.

* cited by examiner

GRADIATOR REFORMER

CROSS-REFERENCE TO RELATED APPLICATIONS AND STATEMENT REGARDING SPONSORED RESEARCH

The present invention claims the benefit of PCT/US09/046403 filed Jun. 5, 2009, which claims priority to the U.S. Provisional Patent Application No. 61/059,989, filed Jun. 9, 2008, the disclosure of which is incorporated herein by reference in its entirety. This invention was not made with any government support and the government has no rights in this invention.

FIELD OF THE INVENTION

The present invention relates to a compact two-in-one desulfurizer-reformer system that produces a ready-to-use hydrogen-rich feed for solid oxide fuel cells (SOFCs).

BACKGROUND OF THE INVENTION

There is no admission that the background art disclosed in this section legally constitutes prior art.

New energy systems are required that can operate on fossil fuels and yet generate few greenhouse gases and polluting emissions. This is becoming an increasing concern since the world's energy infrastructure essentially dictates the continued (and increased) use of fossil fuels for the next several years and maybe decades. The use of different types of resources, such as coal and natural gas, can still provide especially attractive energy systems. In order to be practical, however, the cost of these new systems must be comparable to that of current energy production technology. This presents an ongoing concern since, in major markets, the efficiency and the environmental performance of such energy systems are not likely to warrant premium prices.

However, currently used logistic fuels, such as coal, diesel and jet fuel, while still an attractive option for power generation compared to the traditional hydrocarbons (such as gasoline), often contain unacceptably high levels of sulfur. For example, while diesel-based logistic fuel (for trucks and locomotives) is the main artery of transportation in the continental US as well as across the globe, diesel fuel is invariably sulfur-laden which can have dramatic effect on the overall fuel economy. Its combustion is attended by emission of sulfur containing species ($SO_x$ mainly).

The presence of sulfur and the gradual build-up and accumulation of sulfur-bearing compounds in the exhaust stream has its toll on the catalytic converters in the vehicles as well. Over time, the catalyst in the catalytic converter is poisoned by the organosulfurs that are invariably present in the diesel fuel. This necessitates a periodic purging and cleaning of the catalyst which is a high-temperature energy-intensive oxidative process (done in a rich air-to-fuel ratio environment) that affects the fuel economy of the vehicle adversely. In the case of other logistic fuels (such as jet and aviation fuels as well as coal) sulfur also causes deleterious effects to the reforming catalysts which are severely poisoned and deactivated.

Because of these problems, one attempt to provide a different energy system includes the development of fuel cell technology. Fuel cells are environmentally clean, quiet, and highly efficient devices for generating electricity and heat from natural gas, biomass, and other fuels.

Also, the fuel cells themselves are vastly different from other power sources. To those skilled in the art, a fuel cell is an electrochemical device that converts the chemical energy of a fuel directly into electrical energy and the associated heat without combustion or moving parts. As such, fuel cells have emerged in the past decade as one of the most promising new technologies for meeting the world's increasing energy needs.

Fuel cells continuously convert chemical energy into electric energy for as long as fuel and oxidant are supplied. Different categories of fuel cells are known, including proton exchange membrane fuel cells (PEMFCs) and solid oxide fuel cells (SOFCs) which are both fueled by hydrogen.

In general, a solid oxide fuel cell (SOFC) operates by receiving reformate (also referred to as a hydrogen-rich gas stream) at an anode inlet; and air or an oxygen containing gas stream at a cathode inlet. A voltage is generated across the anode/electrolyte/cathode assembly in an open-circuit mode (under zero electrical load). In the presence of an applied load in the form of imposed current, charges are driven in the external circuit and electrical power (=current×voltage) is generated. The SOFC generally has a dense ceramic membrane, permeable only to either oxygen or hydrogen ions; called an oxygen ion or a proton (hydrogen ion) conductor, respectively. With solid electrolyte membranes that are comprised of an oxygen ion conductor, the molecular oxygen at the porous cathode ionizes by picking up electrons from the external circuit, moves through and across the electrolyte, and reacts with hydrogen (or other fuel components) at the anode/electrolyte interface, thereby forming water (or other products) and releasing electrons to the circuit, thus completing the circuit.

In SOFCs that use logistic sources of fuel, the hydrogen-rich fuel stream can contain small fractions of carbon monoxide, carbon dioxide, low hydrocarbons such as methane or ethane, with water vapors and/or some nitrogen as diluents, along with undesirable sulfur-laden components.

In addition, SOFCs can also be fueled by other fuels such as carbon monoxide, natural gas and other hydrocarbons. The primary advantages of fuel cell power generation include increased efficiency, lower weight, smaller size, less air pollution, and reduced noise.

Fuel cells are being considered for use in many different applications. For example, they may be used to power automobiles such as passenger cars and light-duty trucks, and naval vessels including surface ships and submarines. NASA envisions employing SOFCs running on jet fuel reformate for its Uninhabited Aerial Vehicle (UAV) and Low Emission Alternative Power (LEAP) missions, as well as for transatlantic and intercontinental commercial airline flights.

The U.S. military is also considering the use of fuel cells that are fueled by jet fuel reformate where the jet fuel is subjected to a reforming process in a fuel processor to produce a hydrogen-rich reformate. However, depending on the source and kind, jet fuels are invariably sulfur-laden. When sulfur is present in any fuel that is used in a fuel cell, the sulfur poisons the fuel cell anode and thereby degrades the performance of the fuel cell. Also, the sulfur present in the fuel poisons the reforming catalyst that is used in the reforming process.

Currently, the fuel reformer uses a catalytic support which is an inert matrix of alumina, silica, magnesia or zirconia. The catalytic support is impregnated with a noble metal catalyst, for example, such as Pt, Pd, Rh and/or Au, or a non-precious metal catalyst such as Ni or Cu.

U.S. Pat. No. 6,713,040 to Ahmed et al., assigned to Argonne National Laboratory, discloses a sulfur-tolerant reforming catalyst consisting of a transition metal supported on a doped ceria. The catalyst is said to be useful for reforming a wide variety of different fuels, including jet fuels. After a reforming process, the reformate gas passes through a sulfur removal zone which includes a sulfur removal agent such as zinc oxide.

Ming et al., *Catalysis Today*, 77 (2002) 51, disclose that Innovatek has developed a sulfur-tolerant (up to 100 ppm sulfur) reforming catalyst for conversion of diesel fuel that operates at a steam to carbon ratio of 3.6 for 220 hours with no deactivation.

Recently, the Pacific Northwest National Laboratory (PNNL) demonstrated such an operation to run a 5-kW SOFC unit on JP-8, a fuel commonly used in military operations (Alex Hutchinson, "Portable fuel cell runs on military jet fuel to power diesel trucks," *Popular Mechanics*, Dec. 12, 2007; (see web site: fuelcellsworks.com/Supppage 8217). Due to their proprietary nature, not many details of the composition of the desulfurizer and/or the reforming catalyst used by PNNL are known. It is believed, however, that the catalytic hydrodesulfurization process developed by PNNL removes sulfur from the JP-8 fuel using syngas as the co-reactant in place of hydrogen. The gas phase operation of the process allows for a significant increase in throughput and a decrease in operating pressure compared with conventional technology. Further, it is believed that the process does not require consumables or periodic regeneration. However, to those skilled in the art, it is evident that the PNNL design though attractive, necessitates the operation of two units independently and hence, is likely to incur higher cost, difficulty in system integration as well as the lack of efficient thermal management.

The current leading fuel cell technology under consideration for transportation and distributed residential power applications is based on a polymer electrolyte membrane fuel cell (PEMFC). This type of fuel cell operates at low temperatures (generally less than about 100° C.). By operating on hydrogen as the energy carrier, very high power conversion efficiencies are possible with the PEMFC, and only water is produced as a byproduct. In reality though, a hydrogen infrastructure that will support large markets is years or even decades away.

Therefore, in the PEMFC, hydrocarbon (i.e., fossil) fuels must first be converted (or reformed) into a hydrogen-rich gas with little or no carbon monoxide or other poisons (e.g., sulfur-bearing species and ammonia). This calls for purification steps with several catalytic stages (such as, low and high temperature water-gas-shift reaction, sulfur removal and ammonia scrubbing), thereby increasing PEMFCs overall complexity and imposing a premium price tag on the PEMFC due to the requirements of very high purity hydrogen and the presence of noble metals in the electrodes.

Fuel cells are primarily characterized by their electrolyte material and, as the name implies, the solid oxide fuel cells (SOFCs) have a solid ceramic oxide electrolyte. The SOFCs generally operate at high temperatures (about 800 to about 1000° C.). Power in the SOFC is generated in multilayer ceramic cells each of which comprises a porous anode layer, a dense electrolyte layer, and a porous cathode layer. Individual cells are connected to each other via an interconnect, thereby making a stack. Power generation in the SOFC involves conversion of oxygen molecules (from air) to oxygen ions at the cathode, conductance of oxygen ions through the electrolyte, and reaction of these oxygen ions with fuel at the anode to form water and carbon dioxide.

For example, SOFC systems operating with natural gas as a fuel can achieve power generation efficiencies in the range of 40 to 45 percent. Hybrid systems, combining solid oxide fuel cells and gas turbines, can achieve efficiencies of up to 70 percent. In another example, Siemens-Westinghouse has been developing SOFC technology for stationary, megawatt-scale power systems operating on natural gas. Their field tests have demonstrated exceptional reliability, with degradation rates less than 0.1 percent per decade over thousands of hours of operation. However, the Siemens-Westinghouse SOFC systems utilize external reformers and are relatively expensive, with projected installed costs of $1500/kW.

What is needed is a method to reduce the costs of SOFC power generation. Such systems would provide attractive options for smaller-scale (5~20 kW) power generation applications within various residential, transportation, industrial, and military market segments. Currently, in the industry, the Solid State Energy Conversion Alliance (SECA)'s goal is to facilitate these cost reduction efforts, with a cost target of $400/kW for 5-kW systems.

One challenge in providing the needed hydrogen-rich fuel stream derived from the logistic fuels described herein for power generation via SOFC stacks, is the presence of significant amounts of sulfur (mainly as organosulfurs) in these fuels. For example, the sulfur level in liquid jet fuels varies between 0.3 to 1%, while that in gasified coal could vary between 2.3 and 4.5%, depending upon the quality of the bituminous coal. This presents a particular challenge since the desulfurization of syngas and the recovery of sulfur are highly energy intensive and remain the major hurdles to be overcome in improving the economics of producing sulfur-free hydrogen-rich streams from logistic fuel sources.

For example, currently used hydrodesulfurization systems, such as ZnO or alumina-supported molybdenum sulfide promoted by nickel or cobalt, must operate in the range of 320-440° C. under conditions of very high $H_2$ pressure (~15-225 atm). The requirement of high $H_2$ pressure in these hydrodesulfurization systems causes both operational and occupational safety issues in the vicinity of an SOFC-based powder generation system.

In addition, the ZnO-based sorption technology in many respects, is an unsatisfactory technology, having such problems as the volatilization of elemental zinc and the formation of $ZnSO_4$ with concomitant volume expansion during regeneration. Moreover, the generation of a SOFC-quality fuel from logistic fuels necessitates a separate reforming step in addition to the desulfurization step, thus increasing the system complexity and cost.

Further, while ceria-based systems offer the possibility of gasified coal desulfurization, the direct production of elemental sulfur during sorbent regeneration necessitates the supply of $SO_2$ externally which, in turn, substantially complicates the system and greatly increases its costs. Moreover, this art requires the use of pressures in the range of about ~5 atmospheres and higher.

In order to overcome the shortcoming of the existing desulfurization technologies, there is a need for sorbent matrices that would be thermally and microstructurally stable and sulfur-active at high temperatures, and that would not require regeneration.

Furthermore, there is a need for robust sulfur-tolerant steam-reforming catalysts.

It would be particularly advantageous if a compact system were developed that would meet both these needs and, would generate high quality $H_2$-rich fuel stream from logistic fuels for SOFCs.

It would also be advantageous if such a ready-to-use high quality $H_2$-rich fuel stream could be derived in a single-reactor module. There is a particular need for a simplified and efficient system that produces SOFC-quality feed in one step.

It would also be advantageous if a system could be developed that did not require a hydrodesulfurization step that uses hydrogen for desulfurization.

It would also be advantageous to provide a system where desulfurization, reforming and power generation, all occur at temperatures less than about 1000° C., thereby obviating the need for conditioning the syngas stream and enhancing the overall efficiency of the entire unit, from desulfurization to reforming to power generation.

SUMMARY OF THE INVENTION

In a first aspect, there is provided herein, a desulfurizer-reformer reactor system comprising a de-sulfurizing material and a reforming catalyst material arranged as a gradient assembly.

In certain embodiments, the de-sulfurizing material and the reforming catalyst material are configured to receive a supply of fuel in a sequential manner.

In certain embodiments, the reactor includes at least two supplies of reforming catalyst material, the de-sulfurizing material being positioned between the two supplies of reforming catalyst material.

In certain embodiments, the de-sulfurizing material is substantially surrounded by reforming catalyst material.

In certain embodiments, the gradient assembly is configured to allow sulfur-laden fuel to pass through the de-sulfurizing material, and resulting de-sulfurized fuel to pass through the reforming catalyst material.

In certain embodiments, the sulfur-laden fuel and the resulting de-sulfurized fuel flow through the gradient assembly in substantially opposite directions.

In certain embodiments, the gradient assembly is configured to allow heat generated in the de-sulfurizing material to be radiated to the reforming catalyst material.

In certain embodiments, the de-sulfurizing material is separated from the reforming catalyst material by a heat exchangeable material.

In certain embodiments, the de-sulfurizing material and the reforming material are in a generally parallel configuration; and the sulfur-laden fuel and resulting de-sulfurized fuel flow through the de-sulfurizing material and the reforming material in substantially opposite directions.

In certain embodiments, the de-sulfurizing material and the reforming material are in a generally concentric configuration; and the sulfur-laden fuel and the resulting de-sulfurized fuel flow through the de-sulfurizing material and the reforming material in substantially opposite directions.

In certain embodiments, the reforming catalyst material comprises a supply of sulfur-tolerant material.

In certain embodiments, the reforming catalyst material comprises at least one noble metal catalyst.

In certain embodiments, the reforming catalyst material comprises at least one noble metal catalyst and a promoter oxide additive.

In certain embodiments, the reforming catalyst material comprises a nanoscale support matrix.

In certain embodiments, the noble metal and/or noble metal with the promoter oxide is dispersed on the nanoscale support.

In certain embodiments, the support matrix is a ceramic material, preferably, a refractory oxide.

In certain embodiments, the refractory oxide support comprises alumina ($Al_2O_3$), magnesia (MgO), silica ($SiO_2$) or zirconia ($ZrO_2$).

In certain embodiments, the reforming catalyst support matrix comprises ceria ($CeO_2$).

In certain embodiments, the reforming catalyst support matrix comprises ceria nominally doped with $Gd_2O_3$ or $ZrO_2$.

In certain embodiments, the reforming catalyst material includes a catalytic support comprising a nanoscale material.

In certain embodiments, the de-sulfurizing material comprises one or more metal oxides.

In certain embodiments, the de-sulfurizing material is dispersed on an inert support.

In certain embodiments, the support comprises diatomaceous type materials.

In certain embodiments, the support comprises a zeolitic-type natural clay.

In certain embodiments, the support comprises a zeolitic-type natural clay comprising zeolitic-type clinoptilolite clay with angstrom-sized pores.

In certain embodiments, the inert support comprises a high periodicity nanoporous biomimetic support.

In certain embodiments, the de-sulfurizing material includes a zeolitic-type lightweight inert support.

In certain embodiments, the support comprises a lightweight zeolitic-type mineral belonging to the family of aluminosilicates.

In certain embodiments, the de-sulfurizing material is thermally and microstructurally stable, sulfur-active at high temperatures, and does not need regeneration.

In certain embodiments, the de-sulfurizing material and the reforming catalyst material are coated onto metallic screens and/or ceramic monoliths.

In another broad aspect, there is provided herein an energy generating system comprising the reactor systems described herein combined with one or more solid oxide fuel cells (SOFC).

In certain embodiments, the SOFC is configured to be operated at or near the same temperature as the reactor system.

In certain embodiments, the de-sulfurizing material and/or the reforming catalyst material are configured to be replaceable without substantially interrupting energy being supplied by the SOFC.

In certain embodiments, the de-sulfurizing material and/or the reforming catalyst material are coated on replaceable screens and/or monoliths.

In certain embodiments, the de-sulfurizing material and/or the reforming catalyst material are configured to be regenerable in a separate process.

In certain embodiments, the de-sulfurizing material and/or the reforming catalyst material are configured to be regenerable using an oxidation process that does not interrupt power generation by the SOFC.

In another broad aspect, there is provided herein a desulfurizer-reformer reactor system comprising at least one de-sulfurizer chamber containing de-sulfurizing material; and at least one sulfur-tolerant reforming catalyst chamber containing sulfur-tolerant reforming catalyst material; the de-sulfurizing chamber being in communication with the reforming chambers such that: i) a stream of a sulfur-laden fuel supplied to the de-sulfurizer chamber passes through the de-sulfurizing material, and ii) resulting de-sulfurized fuel passes through the reforming catalyst material.

In certain embodiments, the de-sulfurizing chamber and the reforming chamber are configured to allow heat generated in one chamber to be radiated to the other chamber.

In another broad aspect, there is provided herein a method for providing sulfur-free hydrogen-rich fuel in a desulfurizer-reformer reactor system comprising a de-sulfurizing material and a reforming catalyst material arranged as a gradient assembly, the method comprising: passing sulfur-laden fuel through the de-sulfurizing material to remove sulfur-bearing species to an acceptable level; and passing the resulting fuel through a reforming catalyst material to produce a hydrogen-rich reformate.

In another broad aspect, there is provided herein a method for generating energy comprising using the methods described herein in combination with one or more solid oxide fuel cells (SOFCs).

In certain embodiments, one or more of desulfurization, reforming and power generation occur at about 800° C.

In certain embodiments, a fraction in the range of about 5 to about 10 weight % of an active component is thoroughly dispersed on a lightweight inexpensive inert support to constitute the desulfurizer.

Various advantages of this invention will become apparent to those skilled in the art from the following detailed description of the preferred embodiments, when read in light of the accompanying drawings.

BRIEF DESCRIPTION OF THE DRAWINGS

The patent or application file may contain at least one drawing and/or photograph executed in color. Copies of this patent with color drawing(s) and/or photographs(s) will be provided by the United States Patent and Trademark Office upon request and payment of necessary fees.

DETAILED DESCRIPTION OF THE PREFERRED EMBODIMENTS

Figure 1A:
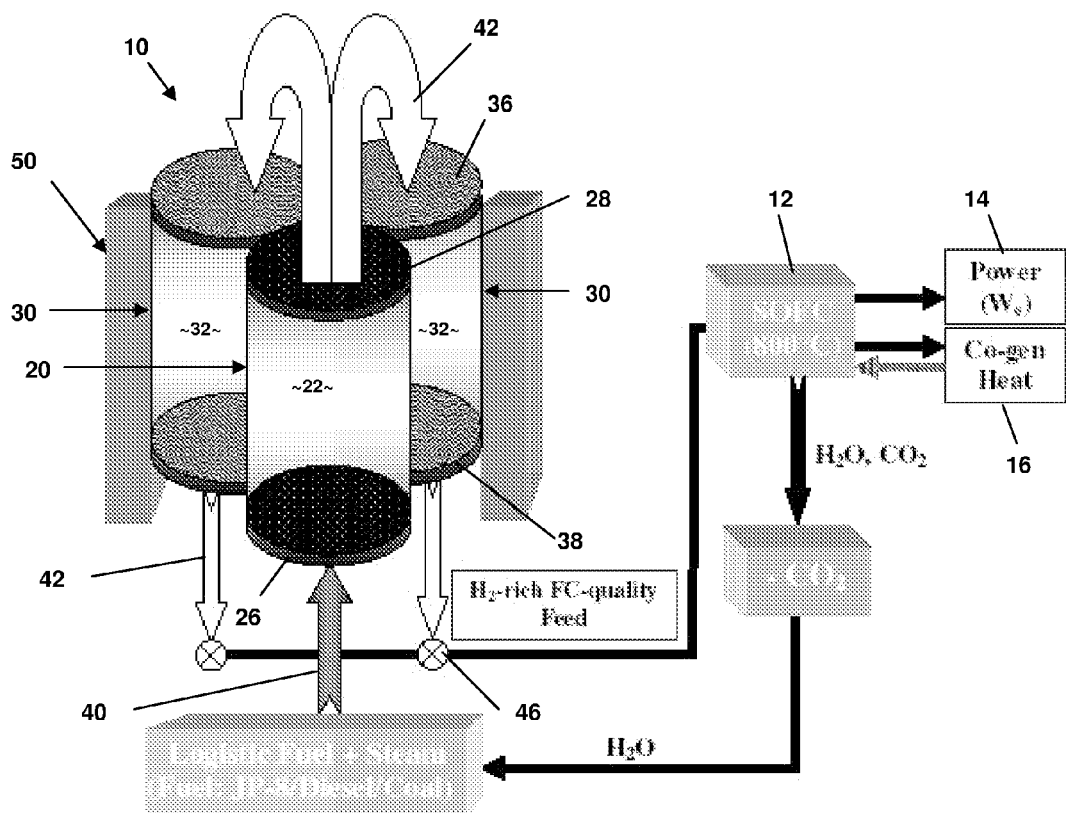
FIG. 1A is a schematic illustration of a dual-function desulfurizer-reformer system that combines with a solid oxide fuel cell (SOFC) stack to generate electrical power.

The sulfur sorbent material is thermally and micro structurally stable, sulfur-active at high temperatures, and does not need regeneration. In certain embodiments, the sulfur-sorbent, or de-sulfurizing material comprises a lightweight nanoporous biomimetic inert support. In one particular embodiment, the sulfur-sorbent material comprises a zeolitic-type lightweight inert support.

Unlike the commercial and industrial practice of sulfur removal via hydrodesulfurization, where either zinc oxide or zinc-titanium-oxide are used as the sulfur sorbents, in the present invention, supported sorbents are used. In one aspect, the present invention utilizes small fraction (5-10 weight %) of the active component thoroughly dispersed on a lightweight inexpensive inert support. After saturation with sulfur, the desulfurizer can be treated as a solid waste and disposed, which is less expensive than its regeneration via high temperature oxidation; this also obviates the problem of dealing with the gaseous sulfur di- and trioxide produced during the regeneration step.

In certain embodiment, the reforming catalyst is preferably a sulfur-tolerant material. Also, the catalytic support can comprise a nanoscale material.

The desulfurizer-reformer reactor system can be configured to impart desirable heat exchange characteristics, more efficient flow and better access of the oncoming fuel stream to the surfaces of the sulfur-sorbent material and the reforming catalyst material.

In one aspect, the sulfur-sorbent material and the sulfur-tolerant catalyst materials are exposed to a gasified fuel stream/steam mixture in a desired sequence.

The desulfurizer-reformer reactor system includes a desulfurization bed or chamber that contains a sulfur-sorbent material, and one or more sulfur-tolerant reforming catalyst beds, or chambers, that contain a catalyst material.

In another broad aspect, there is provided herein a method for generating clean, sulfur-free, hydrogen-rich feed from logistic fuels for the fuel cells in a single reactor system. In certain embodiments, the method includes feeding steam or a mixture of air and steam with sulfur-laden fuel through a desulfurizing (i.e., sulfur-sorbent) material to substantially eliminate sulfur-bearing species from the air/steam-fuel mixture. The sulfur-sorbent material reduces, or denudes, the sulfur-bearing species in the fuel to an acceptably low level and in a simpler form (mostly $H_2S$ and/or COS). The method then includes passing a stream of the sulfur-denuded fuel-steam mixture over a reforming catalyst material. The reforming catalyst is tolerant to the low sulfur level in the oncoming sulfur-denuded stream and is also capable of further removing additional sulfur, if needed, from the denuded-fuel. In certain embodiments, one or both of the desulfurization step and the fuel reforming step occur at essentially the same temperature; in one example, at about 800° C.

In still another broad aspect, there is provided herein a method of reforming a fuel that includes: i) subjecting a sulfur-containing fuel to a desulfurization process to produce a substantially sulfur-free fuel; ii) subjecting the sulfur-free fuel to a reforming process to produce a hydrogen-rich reformate using a catalyst material that comprises a catalytic support that is tolerant to sulfur and a reforming catalyst that is supported on the sulfur-tolerant catalytic support and the combination as a whole is sulfur-tolerant reforming catalyst.

Figure 1B:
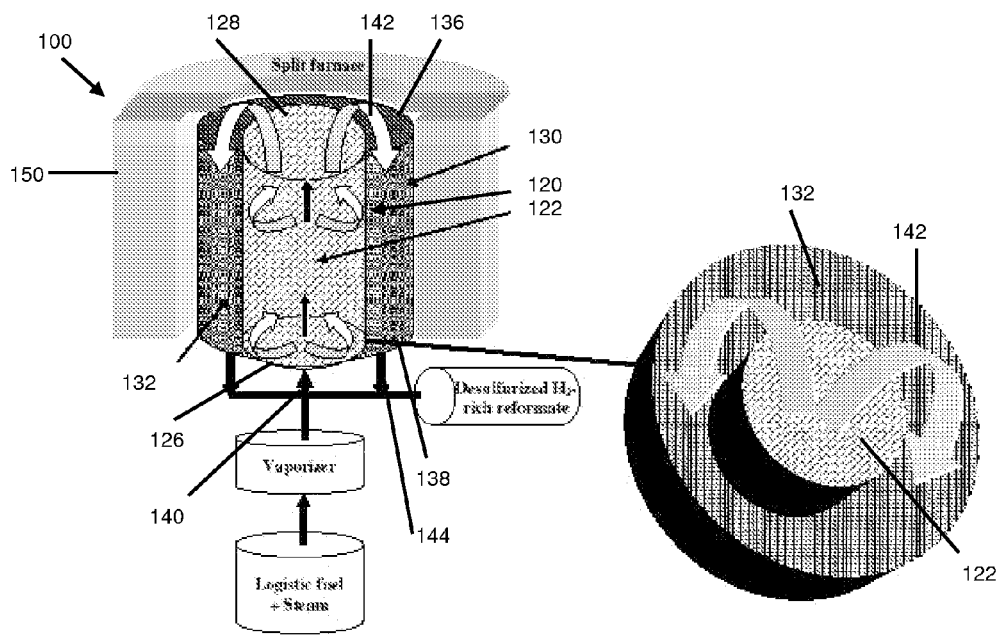
FIG. 1B is a schematic illustration of a concentric design of the 2-in-1 desulfurizer-reformer system that produces a fuel cell quality sulfur-free hydrogen-rich reformate.
Figure 1C:
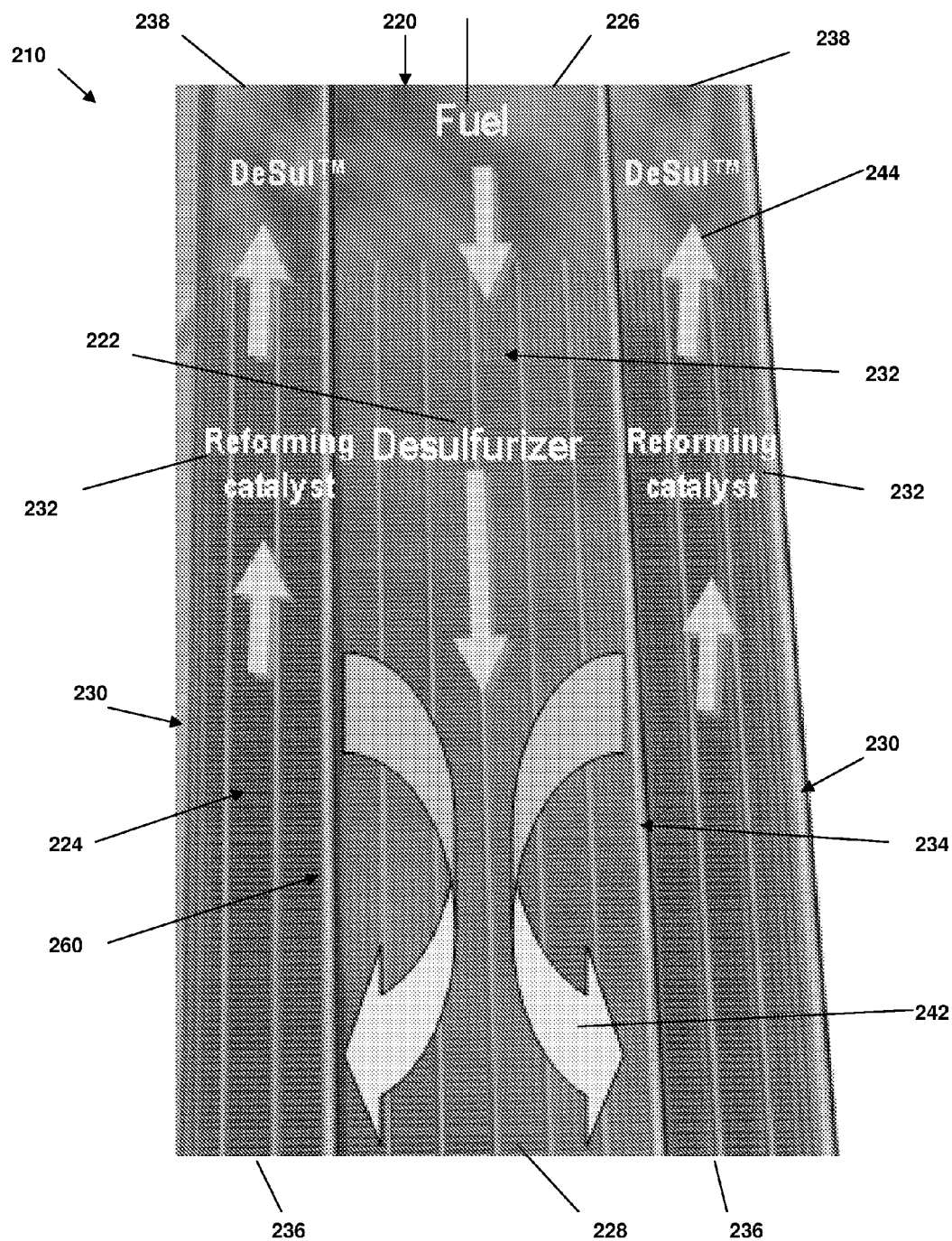
FIG. 1C is a schematic illustration of the flow fields of various components of the fuel processing as they encounter the desulfurizer and the reforming catalyst supported on the lightweight metallic screens or within the channels of the ceramic monoliths.

Referring now to the schematic illustrations in FIGS. 1A-C, schematic illustrations of desulfurizer-reformer reactor systems are shown.

FIG. 1A is a schematic illustration of a dual-function desulfurizer-reformer reactor system 10 (hereinafter sometimes referred to as the "desulfurizer-reformer functionally gradient system 10" and/or the "reactor system 10") that is combined with a solid oxide fuel cell (SOFC) stack 12 to generate electrical power 14 and/or heat 16 (which can, in certain embodiments, be returned to the SOFC 12 and/or the desulfurizer-reformer system 10).

In FIG. 1A, the reactor system 10 includes a de-sulfurizer chamber 20 that comprises a bed of a de-sulfurizing material 22, which is further described herein. It is to be understood that the schematic illustrations herein have been simplified for ease of illustration; for example, while the de-sulfurizer chamber 20 is not illustrated as being filled with the de-sulfurizing material 22, such chamber 20 would be filled in many embodiments.

The reactor system 10 further includes one or more sulfur-tolerant reforming catalyst chambers 30, each including a bed of sulfur-tolerant reforming catalyst material 32, which is further described herein. Again, it is to be understood that the schematic illustrations herein have been simplified for ease of illustration; for example, while the reformer chamber 30 is not illustrated as being filled with the catalyst material 32, such chamber 30 would be filled in many embodiments.

The de-sulfurizing chamber 20 is connected to, or in communication with, the reforming chambers 30 such that a stream 40 of a sulfur-laden fuel-steam mixture is supplied to a first end 26 of the de-sulfurizer chamber 20. The stream 40 passes through the de-sulfurizing material bed 22 where substantially all of the sulfur is removed from the sulfur-laden fuel, as further described herein.

A stream 42 of de-sulfurized fuel-steam exits from a second end 28 of the de-sulfurizer chamber 20. The de-sulfurized fuel-steam stream 42 is then supplied to a first end 36 of the reforming chamber 30. The de-sulfurized fuel-steam stream 42 passes through the reforming catalyst material bed 32 where substantially all of the fuel is reformed into hydrogen-rich fuel cell quality feed, as further described herein. A stream 44 of the hydrogen-rich fuel cell quality feed 44 exits from a second end 38 of the reforming chamber 30. The stream 44 can pass through control mechanism 46 before being supplied to the SOFC 14, if desired.

A furnace 50 can surround the desulfurizer-reformer system 10 to supply heat. Also, in the configuration shown in FIG. 1A, the flow of the fuel streams through the chambers 20 and 30 is such that heat from one chamber (where exothermic reactions are occurring) is immediately captured and delivered to adjacent chambers (where endothermic reactions are occurring). In certain embodiments, the chambers 20 and 30 can be set in a generally parallel configuration such that heat can radiate through adjacent walls of the chambers 20 and 30.

As the fuel-steam stream passes through the de-sulfurizer chamber 12 and reacts with the desulfurizing material 22, the sulfur from the fuel is scavenged. As the fuel passes over the reforming catalyst material 32, a $H_2$-rich reformate is produced. The $H_2$-rich reformate 44 is then ready to be fed into an SOFC stack in FIG. 1A. It is to be noted that, in certain embodiments, the SOFC 14 can be operated at or near the same temperature as the desulfurizer-reformer reactor system 10.

FIG. 1B is a schematic illustration of a concentric 2-in-1 desulfurizer-reformer system 110 that produces a fuel cell quality sulfur-free hydrogen-rich reformate.

In FIG. 1B, the reactor system 110 includes a de-sulfurizer chamber 120 that includes a bed of a de-sulfurizing material 122, which is further described herein. It is to be understood that the schematic illustrations herein have been simplified for ease of illustration; for example, while the de-sulfurizer chamber 120 is not illustrated as being filled with the de-sulfurizing material 22, such chamber 120 would be filled in many embodiments.

The reactor system 110 further includes a concentric sulfur-tolerant reforming catalyst chamber 130 that includes a bed of sulfur-tolerant reforming catalyst material 132, which is further described herein. Again, it is to be understood that the schematic illustrations herein have been simplified for ease of illustration; for example, while the reformer chamber 130 is not illustrated as being filled with the catalyst material 132, such chamber 130 would be filled in many embodiments.

The de-sulfurizing chamber 120 is connected to, or in communication with, the reforming chamber 130 such that a stream 140 of a sulfur-laden fuel-steam mixture is supplied to a first end 126 of the de-sulfurizer chamber 120. The stream 140 passes through the de-sulfurizing material bed 122 where substantially all of the sulfur is removed from the sulfur-laden fuel, as further described herein.

A stream 142 of de-sulfurized fuel-steam exits from a second end 128 of the de-sulfurizer chamber 120. The de-sulfurized fuel-steam stream 142 is then supplied to a first end 136 of the reforming chamber 130. The de-sulfurized fuel-steam stream 142 passes through the reforming catalyst material bed 132 where substantially all of the fuel is reformed into hydrogen-rich-fuel-cell quality feed, as further described herein. A stream 144 of the hydrogen-rich-fuel-cell quality feed 144 exits from a second end 138 of the reforming chamber 130.

A furnace 150 can surround the desulfurizer-reformer system 110 to supply heat. Also, in the configuration shown in FIG. 1B, the flow of the fuel streams through the chambers 20 and 30 is such that heat from one chamber (where exothermic reactions are occurring) is immediately captured and delivered to adjacent chambers (where endothermic reactions are occurring). In certain embodiments, the chambers 120 and 130 can be set in a generally parallel configuration such that heat can radiate through adjacent walls.

FIG. 1C is a schematic illustration of the flow fields of various components of the fuel processing as they encounter the desulfurizer and the reforming catalyst supported on the lightweight metallic screens or the channels of the ceramic monoliths.

In FIG. 1C, a reactor system 210 includes a de-sulfurizer chamber 220 that includes a bed of a de-sulfurizing material 222, which is further described herein. It is to be understood that the schematic illustrations herein have been simplified for ease of illustration; for example, while the de-sulfurizer chamber 220 is not illustrated as being filled with the de-sulfurizing material 222, such chamber 220 would be filled in many embodiments.

The reactor system 210 further includes one or more sulfur-tolerant reforming catalyst chambers 230 that each includes a bed of sulfur-tolerant reforming catalyst material 232, which is further described herein. Again, it is to be understood that the schematic illustrations herein have been simplified for ease of illustration; for example, while the reformer chamber 230 is not illustrated as being filled with the catalyst material 232, such chamber 230 would be filled in many embodiments.

The de-sulfurizing chamber 220 is connected to, or in communication with, the reforming chambers 230 such that a stream 240 of a sulfur-laden fuel-steam mixture is supplied to a first end 226 of the de-sulfurizer chamber 220. The stream 240 passes through the de-sulfurizing material 222 where substantially all of the sulfur is removed from the sulfur-laden fuel, as further described herein.

A stream 242 of de-sulfurized fuel-steam exits from a second end 228 of the de-sulfurizer chamber 220. The de-sulfurized fuel-steam stream 242 is then supplied to a first end 236 of the reforming chamber 230. The de-sulfurized fuel-steam stream 242 passes through the reforming catalyst material bed 232 where substantially all of the fuel is reformed into hydrogen-rich fuel-cell quality feed, as further described herein. A stream 244 of the hydrogen-rich fuel cell quality feed 44 exits from a second end 238 of the reforming chamber 230. The stream 244 can pass through control mechanisms (not shown) before being supplied to the SOFC, if desired. A furnace (not shown) can surround the desulfurizer-reformer system 10 to supply heat. Also, in the configuration shown in FIG. 1C, the flow of the fuel streams through the chambers 220 and 230 is such that heat from one chamber (where exothermic reactions are occurring) is immediately captured and delivered to adjacent chambers (where endothermic reactions are occurring). In certain embodiments, the chambers 220 and 230 can be set in a generally parallel configuration such that heat can radiate through adjacent walls.

In the embodiment shown in FIG. 1C, the sulfur-sorbent material 222 is coated onto fine-meshed metallic screens 224 that are positioned in the de-sulfurizing chamber 220. Also, in the FIG. 1C embodiment, the reforming catalyst material 232 is coated onto metallic screens 234 that are positioned in the reforming chambers 230. The de-sulfurizing chamber 220 and the adjoining reforming chambers 230 can be separated by a suitable partitioning material 260, preferably metals or alloys. Each partitioning material can serve as an efficient heat transfer wall that can compensate for the endothermic steam reforming that occurs in the outer chambers.

In certain non-limiting embodiments, one or more of the functional materials (i.e., the de-sulfurizing material 22 and/or the reforming catalyst material 32) can be placed on metallic screen supports (by, for example, coating). In other embodiments, the functional materials are infiltrated into channels and coated on the exterior surfaces of ceramic monolithic honeycomb structures. The exposure sequence maximizes the functionalities of the materials and extends their performance at the temperatures of interest.

In yet another embodiment where concentric design is used, the central chamber can be a lightweight ceramic honeycomb infiltrated with the desulfurizer formulations and suitably inserted and placed within a hollowed out outer honeycomb which is suitably infiltrated with the sulfur-tolerant catalytic formulation. This entire concentric unit can be encased in an enclosure, preferably a metal or an alloy. The close proximity of the two monoliths provides an energy-efficient advantage where the exothermicity of the desulfurization process occurring in the central compartment makes up for the slight endothermicity of steam-reforming occurring in the surrounding enclave.

Functional Materials

The system described herein provides a clean, sulfur-free, hydrogen-rich feed for the fuel cells from jet fuel or gasified coal streams, using two different functional materials: the de-sulfurizer and the reforming catalyst.

The de-sulfurizing (i.e., sulfur-sorbent) material is comprised of one or more metal oxide(s) that are dispersed substantially uniformly on an inert support. In one non-limiting embodiment, the inert support for the de-sulfurizing material can be a high periodicity nanoporous biomimetic support. In another non-limiting embodiment, the support can be a lightweight zeolitic-type mineral belonging to the family of aluminosilicates.

The second functional material is a reforming catalyst that is comprised of a noble metal (NM) or a combination of several noble metals (NMs) supported on a nanoscale catalyst support.

The system described herein is a departure from traditional packed beds, fluidized beds and metallic monolithic or corrugated foil supports. The system described herein provides a compact and efficient design. The somewhat exothermic nature of the desulfurization process and the intimate partitioning of chambers having thin walls act to compensate for the somewhat endothermic steam reforming process that occurs in the adjoining chambers, via efficient heat transfer.

The system described herein imparts better heat exchange characteristics, more efficient flow and better access of the oncoming gas to the solid surfaces than currently available systems.

The unified and compact system described herein is also attractive for providing clean power to a number of end-users, particularly via logistic fuel utilization in a much more efficient way than that by those currently known to those aware of the art.

During the operation of the dual-function desulfurizer-reformer reactor system, the air/steam-fuel mixture is fed first into the desulfurizer chamber to denude the mixture of sulfur-bearing species to an acceptable level. The sulfur-denuded stream is then allowed to pass over the reforming catalyst, which is tolerant to the sulfur level in the oncoming stream and is also capable of picking up additional sulfur, if needed, without compromising its ability to reform.

In certain other embodiments, the fuel mixture can be fed into the reformer chamber first, where the sulfur-tolerant catalyst converts it into a hydrogen-rich reformate with some remnant sulfur, which can then be led into the desulfurizer chamber to strip the sulfur fully, making the stream amenable to be fed into the SOFC stack.

In a particular embodiment, the desulfurization material is an agile sulfur-sorbent that uses an extremely lightweight, nanoporous, biomimetic support. In one non-limiting example, the support can comprise diatomaceous type materials. In another non-limiting example, the support can comprise a zeolitic-type natural clay which can be used as a support for the sulfur-active sorbents.

In one embodiment, the sulfur-tolerant catalyst formulations can comprise nanoscale ceria matrices (for example, ceria nominally doped with $Gd_2O_3$ or $ZrO_2$ in order to impart additional stability and enhance oxygen ion transport via vacancy creation), supporting precious metal(s).

The desulfurizer-reformer reactor system described herein allows for the operation of the following steps: i) fuel gasification, ii) desulfurization, iii) steam reforming, and iv) generation of high quality $H_2$-rich syngas feed ready for power generation via solid oxide fuel cell stack, where all these steps can be conducted approximately in the same temperature regime. Also, in certain embodiments, the co-generated heat from the SOFC stack can be used to sustain other stages of the energy generation process.

The desulfurizer-reformer reactor system described herein provides several distinct advantages. A first advantage is the use of novel sulfur-tolerant catalysts for logistic fuel reforming, as described herein. A second advantage is the combination of materials that are used for the effective sulfur removal from the gas stream. Another feature is the combination of gadolinia and/or zirconia doped $CeO_2$-based reforming catalyst materials with sulfur-sorbent formulations. Examples of desirable sulfur-sorbent formulations include the agile sulfide formers that are embedded in a highly periodic nanoporous structure. In certain embodiments, useful nanostructures include diatomaceous earth and zeolitic-type natural clay materials.

In certain embodiments, the selection of agile sulfur sorbents is based on the thermodynamic stability of a number of metal sulfides. From the standpoint of the ease of sulfide formation, transition metal oxides (including those of titanium, iron, nickel, copper, zinc, lanthanum, yttrium, gadolinium, tin and their binary and ternary combinations) can be employed.

In order to achieve an effective and homogeneous dispersion of the de-sulfurizing (i.e., sulfur sorbent) materials throughout the support, the dispersion of the precursor can be controlled by adjusting one or more of the following parameters: dispersion of a suitable ionic salt in suitable aqueous/non-aqueous media, pH adjustment, refluxing (to reduce the solvent volume), drying, calcination and sieving.

In the dispersion procedure, suitable metal oxide(s) are impregnated into and/or onto appropriate support materials that have substantially benign features such as open porosity (diatomaceous earth) and/or cage-like structure (zeolite-type). It is to be understood, that in certain embodiments, techniques such as impregnation can be employed to provide high and uniform dispersion of the sulfur-active materials onto the supports, followed by appropriate calcination, leaving behind metal oxide particles embedded in the pores and voids.

After the sulfur pick-up, the corresponding oxides can easily be regenerated by mild oxidation of the sulfided materials in air, if needed. In other embodiments, since the unsulfided and the sulfided materials are inexpensive and lightweight materials with low level loading of the sulfide formers, treating the spent material as solid waste would make more economical sense.

For coating into the metal screens, the sorbent formulation can be mixed with an organic dispersant in α-terpenol, homogenized well into a slurry and applied uniformly with a paint brush. In certain embodiments, an inorganic binder such as boehmite (AlOOH) is added to enhance the adhesion of the active material (desulfurizer and the catalyst) to the support which could be a metallic screen, or foil or a monolith. The solid loading can be gradually increased to the desired level by painting and drying in a cyclic manner with intermediate firing, if desired to enhance the adhesion of the coated layer. In one example, for effective infiltration within the honeycomb channels of the monolith, as well as coating on the outer surface of the monolith, the monolith itself can be submerged in the above-mentioned slurry containing the formulation, dispersant, binder and the fugitive solvent media. This technique provides an effective incorporation of the coating material within the channels, as well as providing a coating on the surfaces of the monolith.

In certain embodiments, calcination can be performed as follows: in air first up to about 325° C. for about 2 h at a rate of ½ degree per minute, followed by heating up to about 500 to 700° C. for about 1 h at a rate of 1 degree per minute. The two-step calcination causes the solvent and dispersant removal and the binder burnout, leading to the formation of an adherent coating onto the substrate (metal screen or the honeycomb channels and surfaces of the monolith). Also, such calcination procedure can be used for the reforming catalyst preparation and loading on the screens and honeycomb channels.

Another advantage that the desulfurizer-reformer reactor design provides is a unified system where both the desulfurization of sulfur-laden fuel and the subsequent reforming occur in a single compact reactor, albeit in sequence.

Yet another advantage is the compactness of the desulfurizer-reformer reactor system. The reduced system size and weight makes the heat integration much easier and more efficient. Moreover, unlike the "hydrodesulfurization" process commonly used, as well as in the recently reported Pacific Northwest National Laboratory (PNNL) research, the desulfurizer-reformer reactor system described herein does not require the use of hydrogen for the desulfurization step.

Additionally, in certain embodiments, instead of coating the two functional materials (viz., desulfurizer material and the reforming catalyst material) on corrugated stainless steel foils, the desulfurizer-reformer reactor system uses a lightweight alloy mesh screen or ceramic monoliths, both of which provide relative larger exposure area and hence higher reactivity.

Still another advantage is that the sorbent-coated screens and/or monoliths and the catalyst-coated metal screens and/or monoliths can be replaced with "fresh" materials when the original screens and/or monoliths become saturated and/or deactivated by exposure to the sulfur-laden fuel stream. The spent materials on the screens and/or monoliths can be regenerated in a separate process, using, for example, a mild oxidation process that does not interrupt power generation by the SOFC.

The materials used in the desulfurizer chamber of the desulfurizer-reformer reactor system are inexpensive and lightweight. This provides an advantage since the naturally-occurring inactive diatomaceous materials are in abundance. Also, in embodiments where the active component is loaded into the desulfurizer chamber of the desulfurizer-reformer reactor system, it provides only a small fraction of the total weight of the desulfurizer-reformer reactor system. Additionally, while the regeneration of the desulfurizer component may, in certain situations, not be an environmentally or economically sound proposition, the desulfurizer material can be treated as a localized solid waste, which is less hazardous than the prospect of its regeneration leading to the formation of sulfur dioxide ($SO_2$) and its ultimate and elaborate capture or release through the smoke stacks. The use of such desulfurizer material also totally obviates the problems plaguing the regenerative aspects of ZnO-based sorbents.

The desulfurizer-reformer reactor system provides an integrated approach which can achieve quantitative desulfurization of the logistic fuel stream with a concomitant conversion of the desulfurized stream into hydrogen-rich reformate via steam reforming over a proven sulfur-tolerant catalyst.

Additionally, with a carbon sequestration (by way of $CO_2$ removal) stage in line (FIG. 1A), the efficiency of the entire system can be enhanced further. The other reaction product, viz., steam, can be fed back into the beginning of the process, thereby conserving the overall water economy of the fuel reforming process.

In addition, the desulfurization and the reforming steps both occur at high temperatures. That is, the desulfurizer-reformer reactor system employs a single unit design for desulfurization and reformation in the same temperature regime, thereby obviating additional conditioning of the processed gas from any of the two streams. The compactness of the reactor design of this invention allows compensation of the endothermicity of the reforming process by the exothermicity of desulfurization.

The hydrogen-rich syngas stream exiting the desulfurizer-reformer reactor system is ready for use as the feed for an SOFC stack at elevated temperatures with adequate $CO_2$ sequestration and water condensation, without the need for much thermal conditioning.

Also, the desulfurizer-reformer reactor system does not rely on the currently used metallic corrugated foil supports. Rather, the desulfurizer-reformer reactor system provides a compact and highly efficient multiple viable design where in one instance, the desulfurizer (in the central chamber) and the catalyst (in the adjacent chambers) are supported on lightweight metal screens or ceramic monoliths and, in the other case the two are supported on concentric structures.

The desulfurizer-reformer reactor system imparts better heat exchange characteristics, more efficient flow and better access of the oncoming fuel stream to the desulfurizer materials and the reforming materials. This unified compact system is especially attractive for providing clean power via logistic fuel utilization.

The desulfurizer-reformer reactor system overcomes several serious limitations of the existing reforming catalyst systems. For example, the desulfurizer-reformer reactor system provides an effective method for optimum dispersion of noble metal(s) and 'promoter' oxide additive(s) by adequate impregnation of aqueous suspensions of nanoscale gadolinia and zirconia-doped ceria powders (surface area $\geq 100$ m$^2$/g).

In addition, the desulfurizer-reformer reactor system successfully incorporates sulfur-binding materials without the degradation of the nanoporous and/or cagey features of the support matrix. The diatomaceous materials in particular provide highly active and agile sorbent formulations to the desulfurizer-reformer reactor system.

EXAMPLES

The TEM images of the as-synthesized catalysts R1M1 (monometal-supported), R1B1 (bimetal (XY)-supported), R1B2 (bimetal (XZ)-supported) and R1T (trimetal (XYZ)-supported) are show in FIGS. 2A-2D. The type of catalysts supported on the ceria matrix is listed in Tables 1 through 4.

Figure 2A:
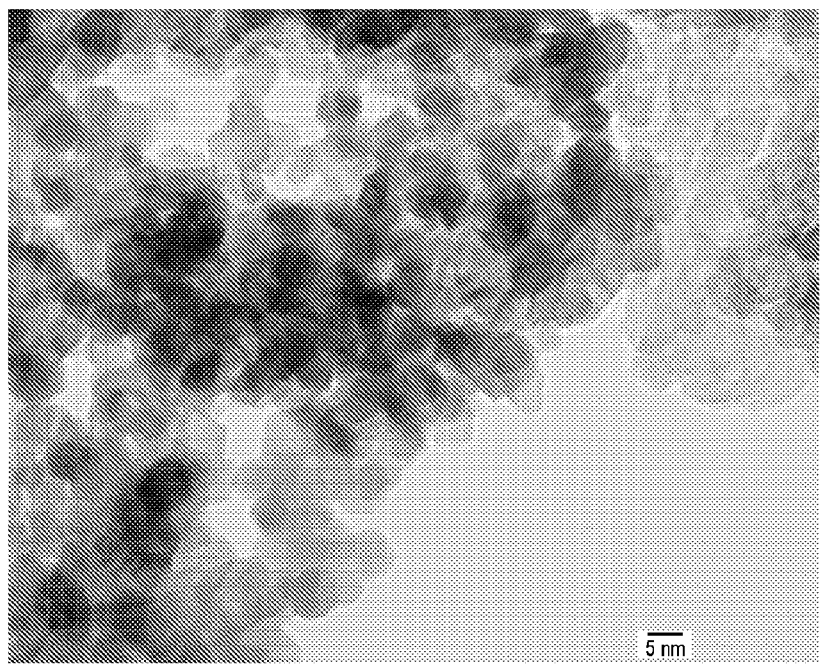
FIGS. 2A, 2B and 2C are transmission electron microscope images of the as-prepared catalysts of this invention, containing monometal (R1M1) and bimetal dispersions (R1B1 and R1B2), respectively.
Figure 2B:
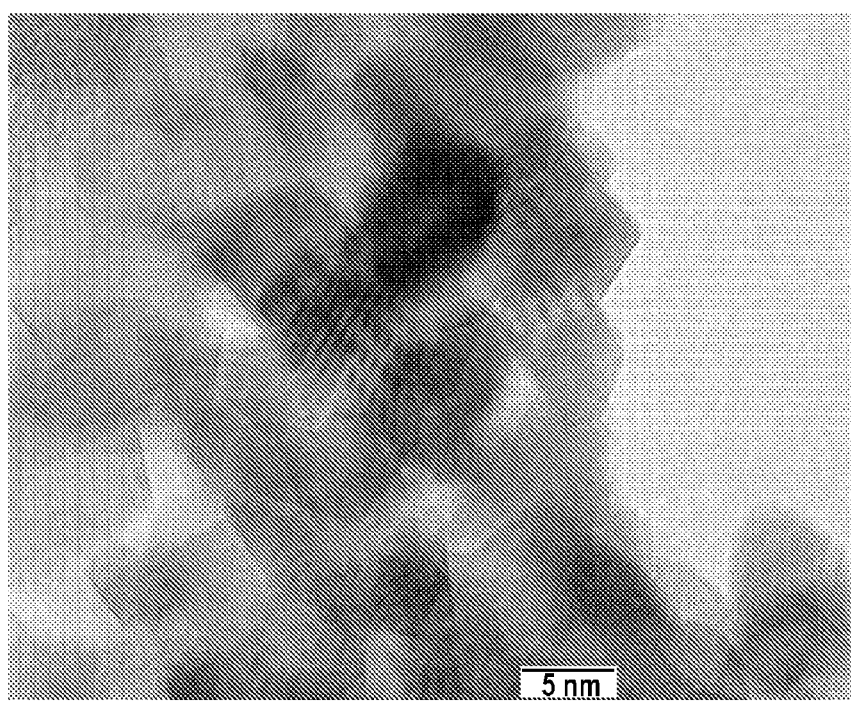
Figure 2C:
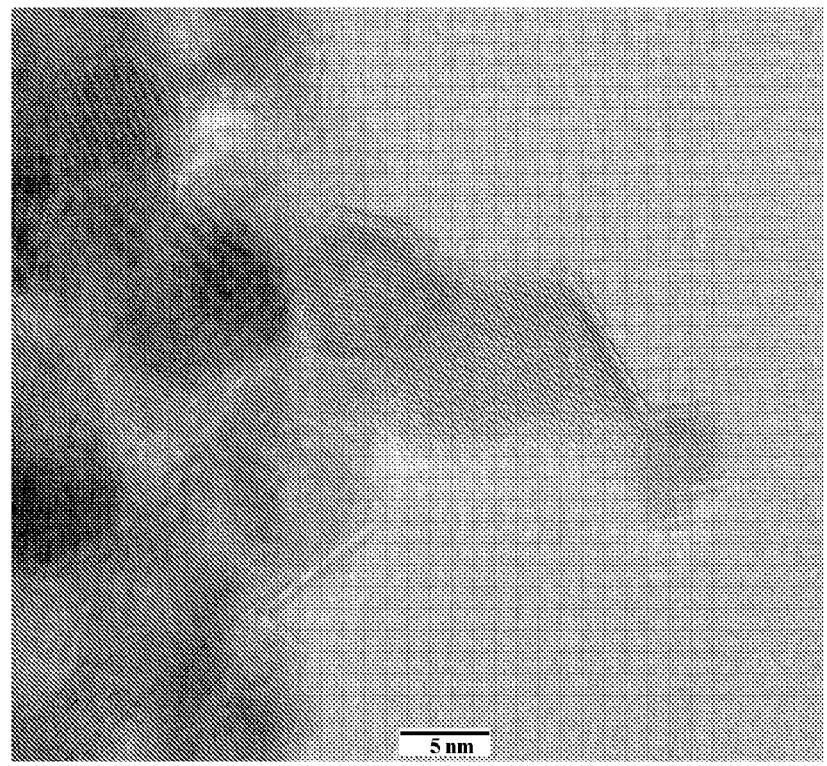
Figure 2D:
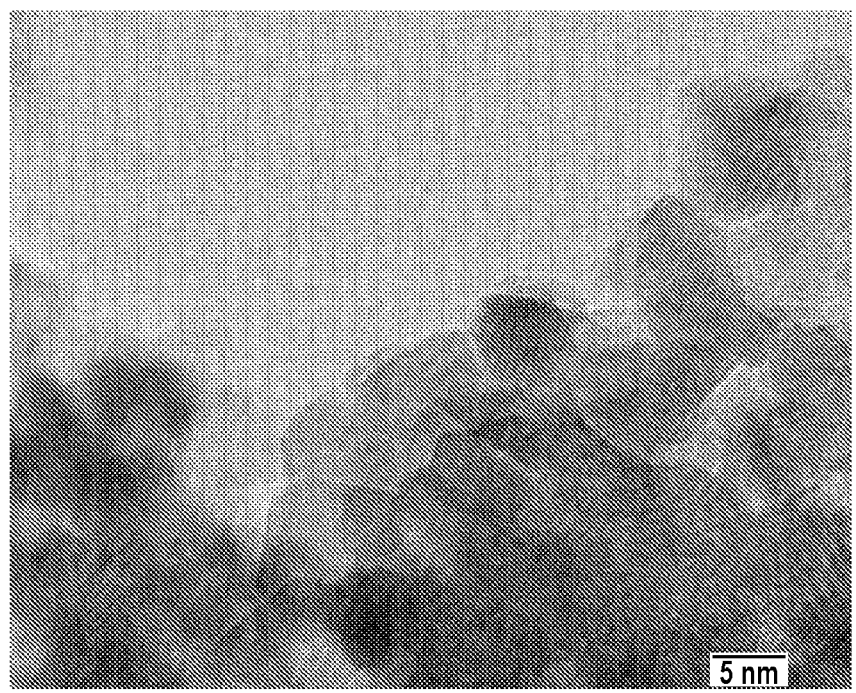
FIG. 2D is the transmission electron microscope image of the as-prepared catalyst R1T of this invention, containing trimetal dispersions.

FIG. 2A shows transmission electron microscope (TEM) images of a monometal composition (R1M1) made with the GDC support according to the invention. FIGS. 2B and 2C show the TEM images of a catalyst composition made with a GDC support containing two different combinations of noble metals. The nanoscale feature of trimetal supported catalyst (R1T) of this invention are shown in FIG. 2D.

In all these cases, the total noble metal dispersion is $\leq 1.33$ wt. %. All catalysts possess nanofeatures. The contrasting light and dark particle contours belong to the gadolinia-doped ceria support and the noble metal(s), respectively. These images further show that the dispersion of the noble metals (even in very low concentrations) is highly uniform throughout the matrix. Thus, the preparatory technique utilized for making these materials is quite effective for yielding uniform distribution of the noble metals throughout the catalyst support.

Figure 2E:
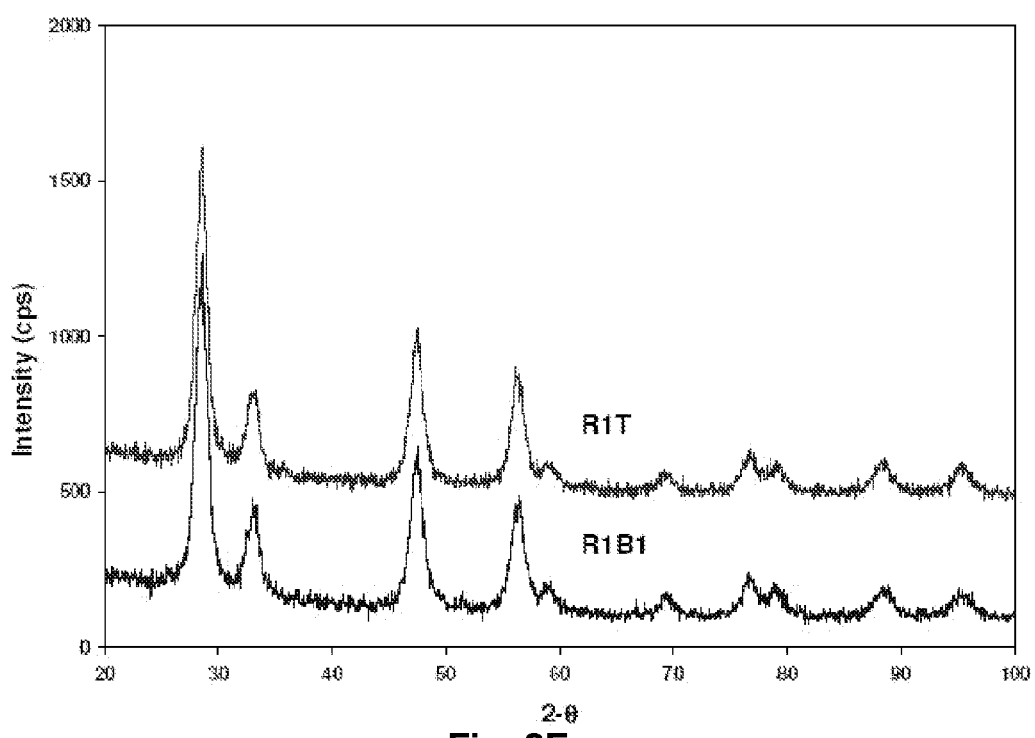
FIG. 2E is a graph showing the comparison of the X-ray diffraction patterns of bimetal-supported (R1B1) and tri-metal-supported compositions calcined for 1 h at 700° C.

The nanofeatures observed in the TEM images are also corroborated by the rather broad diffraction peaks in the XRD patterns shown in FIG. 2E. The nanofeatures of these formulations ensure large surface area and effective noble metal dispersion. This lowers the precious metal loading and keeps the manufacturing cost low without compromising the performance.

Figure 3A:
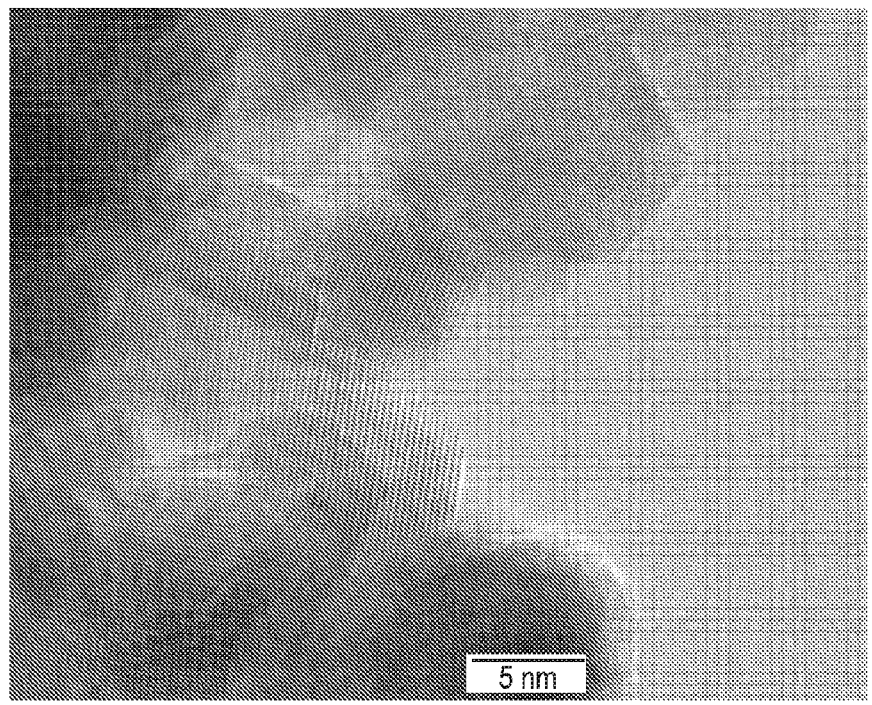
FIG. 3A is the transmission electron microscope image of a catalyst composition with bimetal dispersion (R1B1) after exposure to 1000 ppm $H_2S$ for 4 h at 800° C.
Figure 3B:
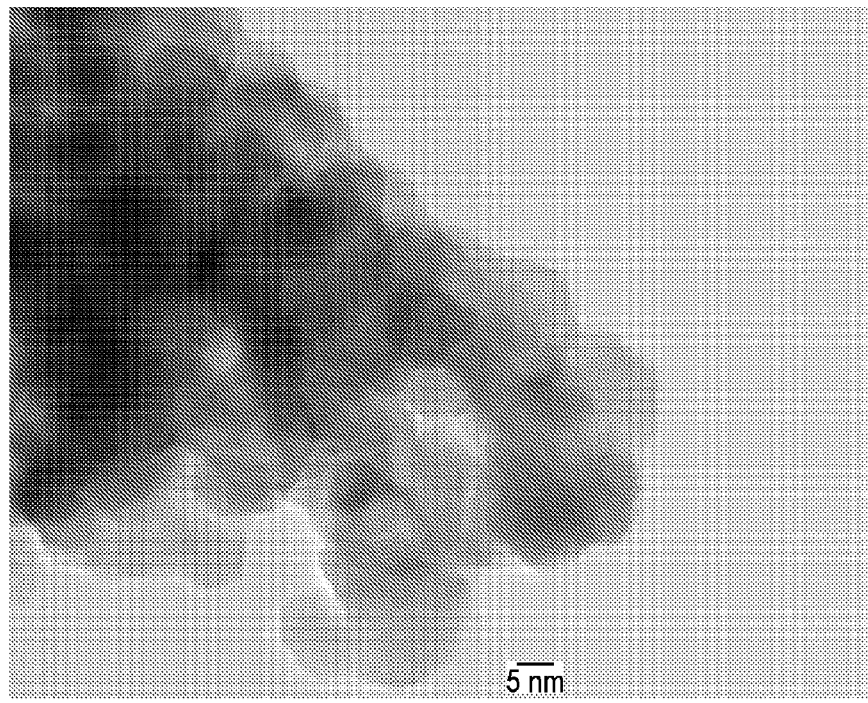
FIG. 3B is the transmission electron microscope image of a catalyst composition with bimetal dispersion (R1B1) after exposure to 1000 ppm $H_2S$ for 24 h at 800° C.

FIGS. 3A and 3B show the transmission electron micrographs of one of the sulfur-tolerant catalysts of the invention after exposure to 1000 ppm sulfur (as hydrogen sulfide, $H_2S$) at 800° C. for 4 and 24 h, respectively. Comparison of the morphological features in sulfur-exposed and fresh matrix (FIG. 2B) indicates no noticeable microstructural degradation except some slight agglomeration at longer soak time (FIG. 3B).

FIGS. 3A and 3B show the TEM images of a post-sulfided R1B1 sample. As can be seen, there is evidence of slight grain growth in the sample sulfided for longer (24 h) duration; the particles have grown to about 10-12 nm in size.

Figure 4:
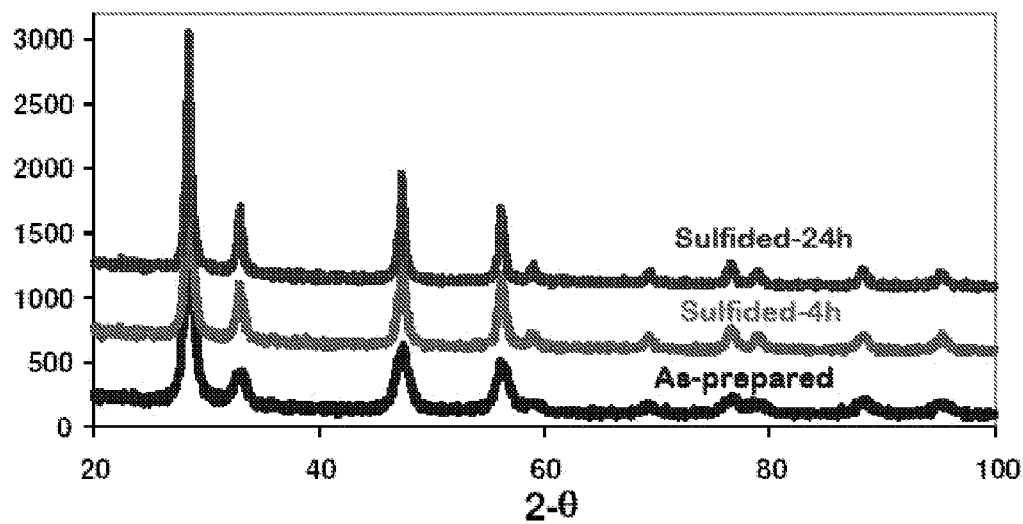
FIG. 4 is a graph showing the x-ray diffraction signatures of sulfur-tolerant catalyst formulation (R1B1) at different soak-time in 1000 ppm $H_2S$ at 800° C.

FIG. 4 shows the XRD patterns of the sulfur-tolerant catalysts of the invention after exposure to 1000 ppm $H_2S$ at 800° C. for 4 and 24 h, together with that of the virgin sample. The XRD patterns of R1B1 sample before and after sulfidation are compared in FIG. 4. The peak sharpening is an indication of systematic crystallinity enhancement as a function of time at high temperature (800° C.); peak narrowing is an artifact of grain growth and crystallite size enhancement upon sulfidation. However, the Scherrer equation calculations and the TEM evidence both suggest that the grain growth in the sulfided samples is only nominal, indicating no significant surface area reduction. It can also be seen that no new phases could be discerned, suggesting phase integrity of the catalysts under aggressive sulfidation at high temperatures.

Figure 5:
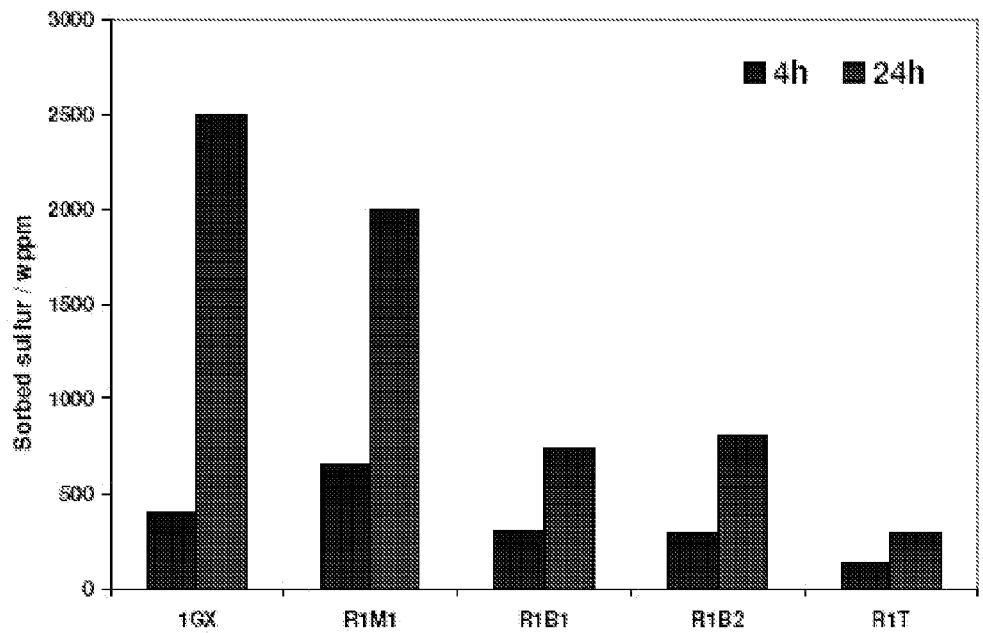
FIG. 5 is a graph showing the sulfur tolerance characteristics of various (monometal-, bimetal- and trimetal-supported) reforming catalyst formulations during exposure to 1000 ppm $H_2S$ at 800° C. for up to 24 h.

The graph in FIG. 5 shows the performance of several GDC-based catalyst compositions of the invention in terms of during sulfur exposure experiments in a nitrogen stream with 1000 ppm sulfur ($H_2S$ equivalent) at 800° C. for 4 and 24 h. The degree of stability in sulfur-laden streams is dependent upon the number and nature of noble metals in these formulations. From the cumulative sulfur sorbed by the catalysts upon exposure to a gas stream containing 1000 ppm $H_2S$ in nitrogen for 4 and 24 h shown in FIG. 5, it can be seen, that amount of sulfur sorbed was considerably lower in the case of bi-metallic formulation than in the case of single-metal dispersion and further decreased in the case of tri-metallic formulations.

With changes in the noble metal composition (both in terms of species and fractional loading), the amount of sulfur pick-up by the formulations of this invention, as indicated by the chemical analysis, progressively decreased. This is equivalent to higher sulfur-tolerance by trimetal supported catalyst than, for example, the monometal; this clearly brings out superior performance that is expected and was experimentally observed from trimetal formulations compared to other analogs under actual fuel reforming conditions.

Examples using Sulfur-Sorbent Materials (Desulfurizers)

Figure 6A:
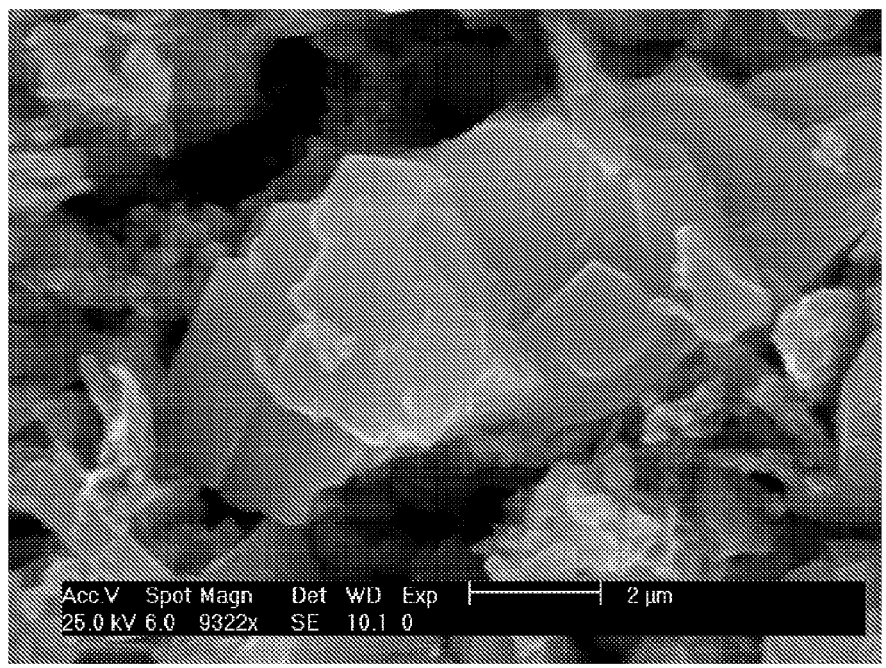
FIGS. 6A and 6B are scanning electron micrograph images of inert support matrices used in the development of desulfurizers: zeolite support matrix (FIG. 6A), and diatomite support matrix (FIG. 6B).
Figure 6B:
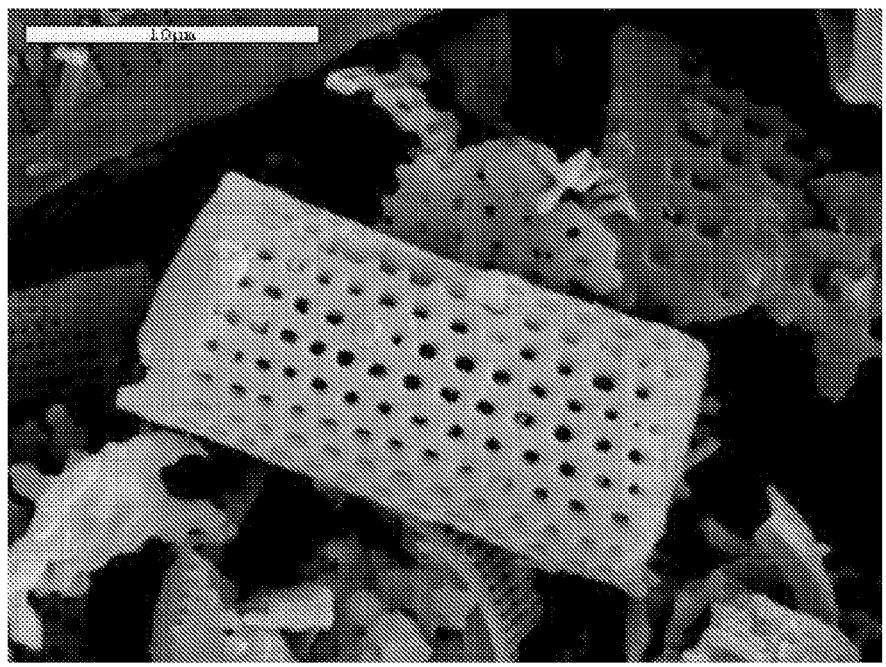

FIGS. 6A and 6B show the morphological artifacts of the two inert matrices that would be used as the support for the desulfurizers of this invention. Zeolitic-type clinoptilolite clay with cagey structure with angstrom-sized pores is nominally alminosilcate (FIG. 6A). Diatomaceous earth (DE) or diatomite is pure silica in composition and is the fossilized remains of a unicellular microorganism called diatom (FIG. 6B). As the SEM image shows, DE is endowed with highly periodic nanoporosity and open structure about 90% of which is empty, making it extremely light. Both these matrices are commercially available in plenty are quite inexpensive.

FIGS. 6A and 6B show the morphological features in the desulfurizer support materials (clinoptilolite and diatomite). Both zeolite-type clinoptilolite and diatomaceous earth (DE) or diatomite are chemically inert and lightweight materials. Hence, they are ideally suited for sulfur sorbent supports. Whereas DE is pure silica, clinoptilolite is a zeolite comprising a microporous arrangement of silica and alumina tetrahedra. DE is a lightweight naturally-occurring fossilized remain of the unicellular microorganism called diatom, and possesses highly ordered nano-pores. It is almost an empty structure (>90% porosity). The diatoms are unicellular, eukaryotic (cell or organism with a membrane-bound, structurally discrete nucleus and other well developed subcellular compartments) algae with silica-based cell walls that range in size from less than 1 to greater than 100 µm. The highly periodic nature and uniform size and shape of the pores combined with their thermal and chemical resistance makes them ideal for impregnation with agile sulfur binding species. Moreover, both the support materials are environmentally benign and structurally robust under extreme thermal and chemical conditions.

Sulfidation experiments were carried out by running a stream of 1000 ppm $H_2S$-balance $N_2$ at a flow rate of 100 sccm over each of the powder formulations for 12 h at temperatures in the range of 600-800° C. The $H_2S$ concentration in the exhaust stream was continuously monitored by a FPD detector in the gas chromatograph to gauge the sorption capacity and to discern the breakthrough, which was a measure of the effectiveness of sulfur capture by a given sorbent.

Figure 7:
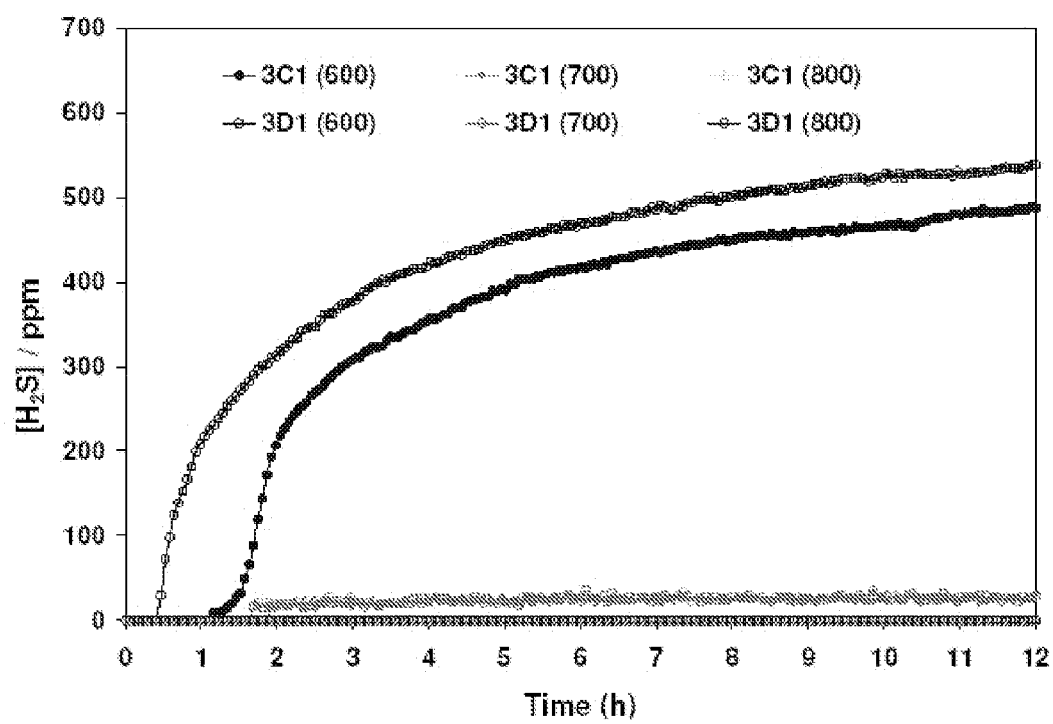
FIG. 7 is a graph showing the temperature dependence of sulfur capture (in terms of $H_2S$ level in the exit stream) during 12 h continuous soak by one of the sorbent formulations in powder form.

The time dependence of $H_2S$ concentration in the exit stream for two formulations; i.e., C1 and D1 in the temperature range of 600-800° C. is shown in FIG. 7.

As seen, the $H_2S$ concentration in the exit stream was lower in the case of C1 compared to D1 over the entire temperature range. This was true in the case of other formulations as well in the C- and D-series. Moreover, at 600° C. and 700° C. the sorbents C1 and D1 exhibited better desulfurization capacity than the other two sorbents. The thermodynamic analysis in terms of standard Gibbs energy of reaction for the formation of sulfide from corresponding oxides, showed rather weak temperature dependence, indicating that the sulfidation reactions are not limited by the thermodynamics and that the reaction kinetics dominated and favored higher temperature desulfurization, which is evident here.

In one example, the lightweight desulfurizers have a sulfur sorption capacity over and extended period of time, soaking (up to ~100 h) in a stream containing 1000 ppm $H_2S$ in a nitrogen background. Sulfur sorption is a prime requirement of logistic fuel reforming, since sulfur poisoning is the main reason for catalyst deactivation. Thus, it is desired, in certain embodiments, that the sorbents exhibit long-term sulfur sorption capability. Therefore, these sorbents were tested for 100 h soaking at 800° C. by coating them on 1-in×9-in corrugated stainless steel foils to enhance the surface area.

Figure 8:
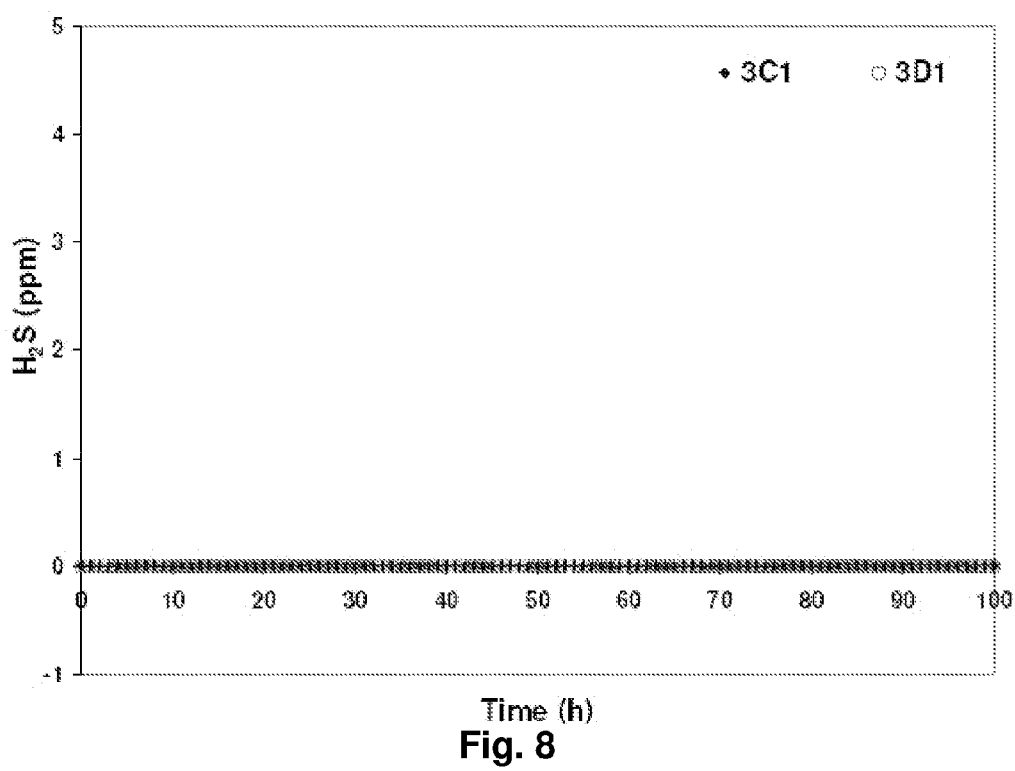
FIG. 8 is a graph showing sulfur capture (in terms of $H_2S$ level in the exit stream) during 100 h continuous soak at 800° C. by the same sorbent coated on a stainless steel foil.
Figure 9A:
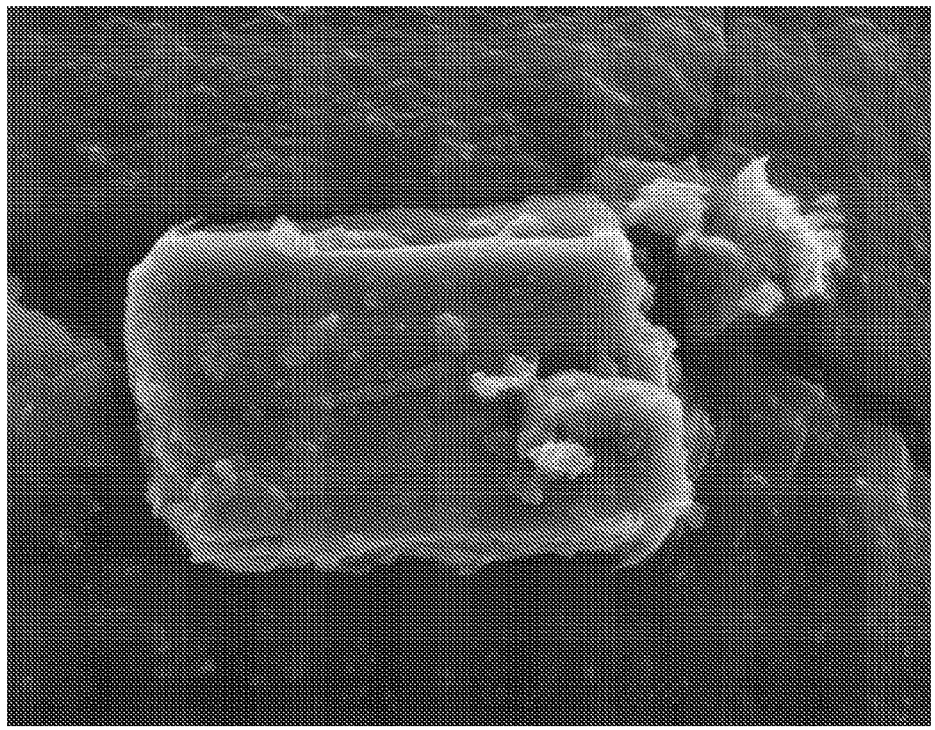
FIG. 9 are photographs showing the elemental mapping in post-sulfided zeolite-based sorbents.
Figure 9B:
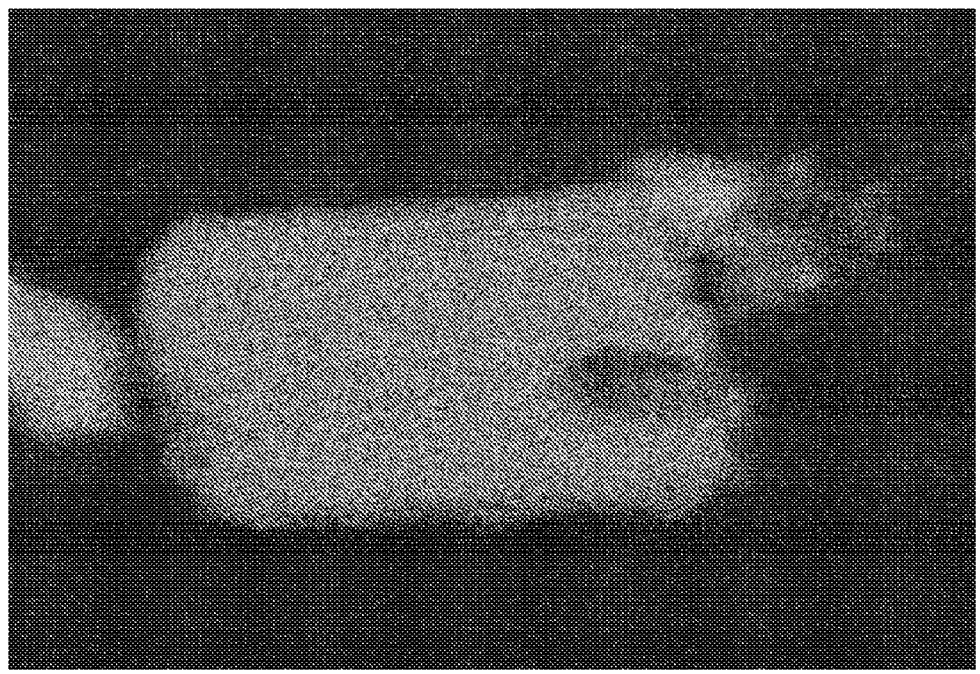
Figure 9C:
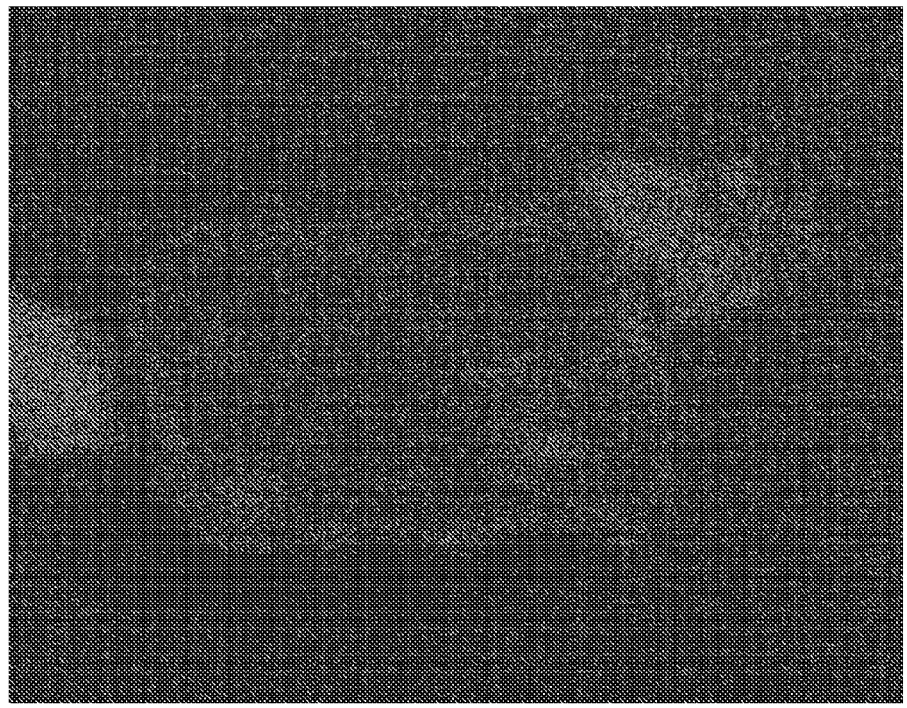
Figure 9D:
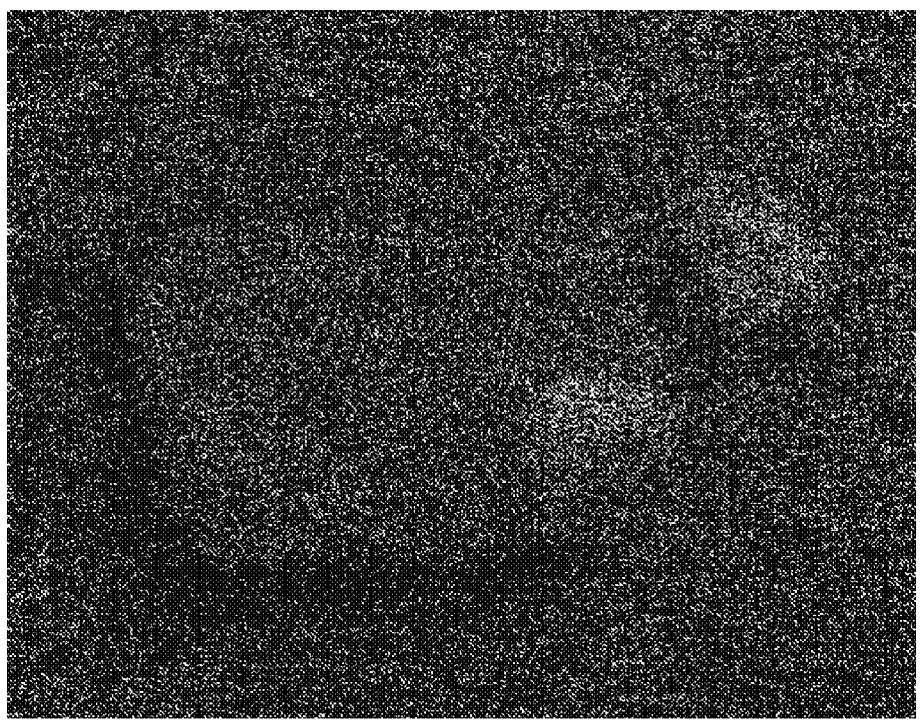
Figure 10A:
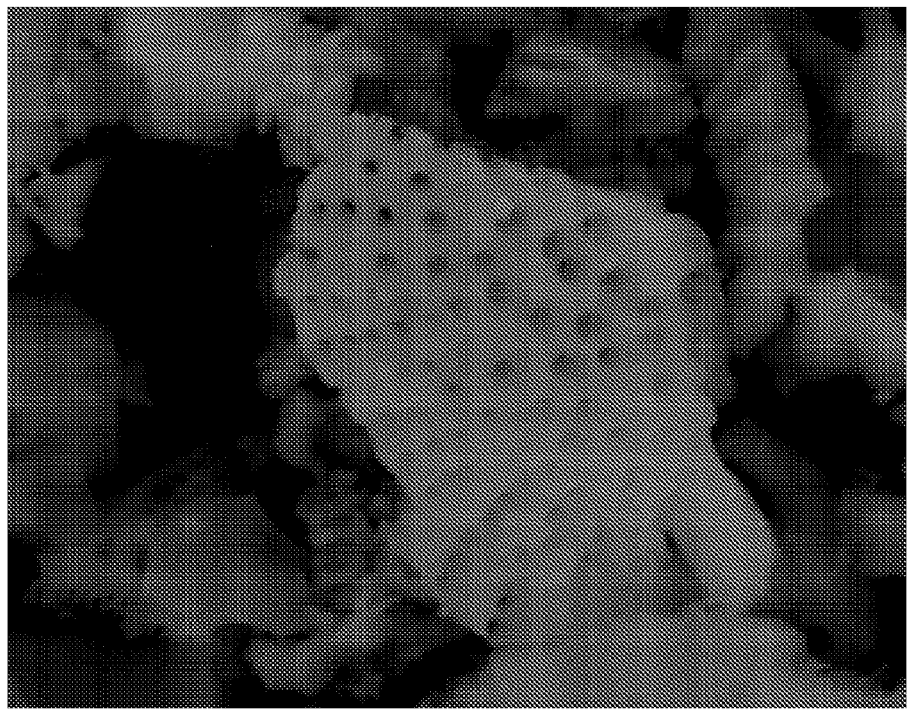
FIG. 10 are photographs showing the elemental mapping in post-sulfided diatomite-based sorbents.
Figure 10B:
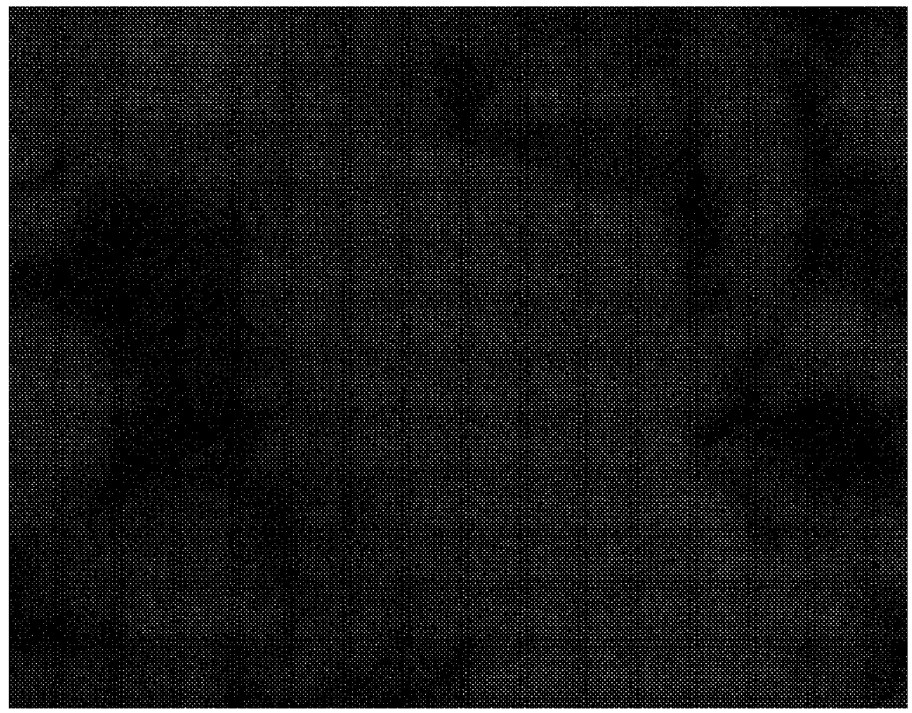
Figure 10C:
Figure 10D:
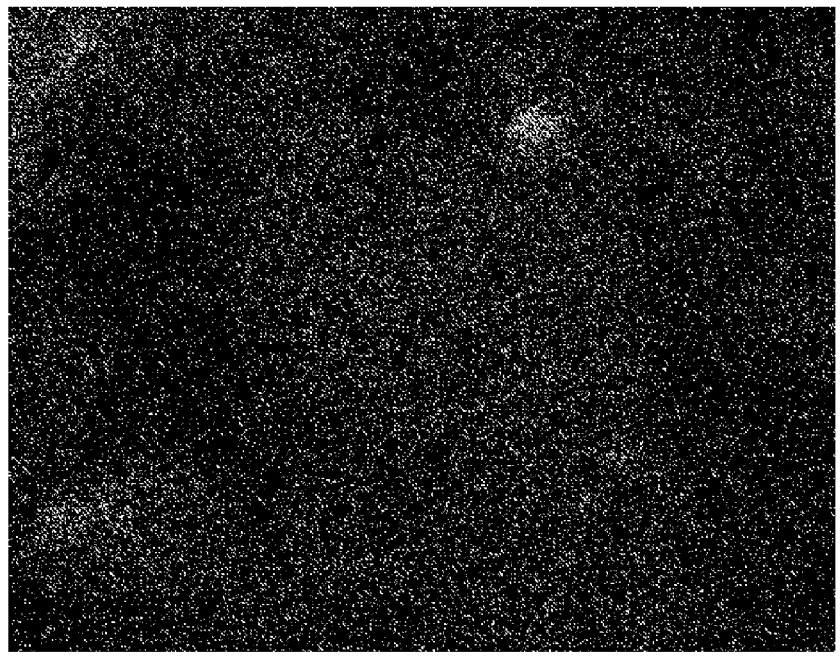

FIG. 8 shows the long-term test results for C1 and D1 sorbents supported on stainless foils. As can be seen, $H_2S$ concentration in the exhaust stream was below the GC detection limit. Thus, increasing the surface area by way of sample preparation and geometry resulted in an increase in sorption potential of the sorbent, thus exhibiting enhanced sorption capability.

FIGS. 9A-9D show the elemental mapping as an evidence of sulfur capture by the sorbents supported on diatomite matrix developed in this invention.

FIGS. 10A-10D show the elemental mapping as an evidence of sulfur capture by the sorbents supported on clinoptilolite matrix, developed in this invention.

Examples of Sulfur-Tolerant Catalysts

In one example, the fuel reforming catalyst formulations comprise nanoscale ceria ($CeO_2$)-based ceramic systems catalyzed with one-, two- and/or three noble metals (NMs) with nanoscale morphology where the total NM loading does not exceed about 1.33 weight percent. This example shows effective steam reforming with appreciable sulfur-tolerance and high hydrogen yield and an improvement over the recently developed series [3-7].

In one embodiment, the catalyst composition includes a support that provides the major structure or framework of the composition. The support is usually in the form of a nanocrystalline refractory ceramic, which is tolerant/resistant to sulfur, thereby giving the catalyst composition a longer life when it is used in a process in which it is exposed to sulfur-bearing species. The sulfur-tolerance of the catalytic support can be characterized in any suitable manner. In certain embodiments, the sulfur tolerance of the catalytic support is characterized by the support being stable as shown by x-ray diffraction pattern of the catalyst after it is exposed to 1000 ppm $H_2S$ at 800° C. for up to 24 h (FIG. 4).

In certain embodiments, the catalytic support has a high surface area and a small particle size, which is a precursor to high activity. For example, the catalytic support may have a surface area of at least about 100 $m^2$/g, and preferably at least about 150 $m^2$/g. In certain embodiments, the catalytic support is a nanoscale material, having any suitable nanoscale particle size, for example a particle size ranging between about 5 nm and about 10 nm. Also, in certain embodiments, the catalytic support is porous and provides a high degree of dispersion of the catalyst(s) and additive(s) described below.

Any suitable material or combination of different materials can be used for making the catalytic support. In certain embodiments, the material used to make the catalytic support is a ceramic material. For example, the catalytic support can be made from aluminum oxide (or alumina, $Al_2O_3$), magnesium oxide (or magnesia, MgO) and silicon dioxide (or silica, $SiO_2$). In certain embodiments, the catalytic support is made from cerium oxide (or ceria, $CeO_2$). Ceria itself has some catalytic properties, so when it is combined with the precious metal in the catalyst composition, the effectiveness of the catalyst composition is accentuated. Similarly, zirconium oxide (or zirconia, $ZrO_2$) may also have some catalytic properties when it is used as the catalytic support.

In certain embodiments, the catalytic support is made from a host and a dopant, where the host is a material such as described above that forms a major portion of the structure of the catalytic support, and the dopant is a different material present in a smaller amount that contributes to forming the structure of the catalytic support, to stabilize it and to enhance its mechanical properties. The dopant can be used in any suitable amount, for example, an amount between about 1% and about 25% by mole fraction of the catalytic support.

Any suitable material can be used as the dopant. The selection of the host and the dopant will depend on factors such as the crystal structure of the host, the extent of solid solubility of the dopant in the host and vice versa, and the retention (stability/integrity upon doping) of the parent crystal structure of the host. In certain embodiments, the dopant is gadolinium oxide (or gadolinia, $Gd_2O_3$), zirconium oxide (or zirconia, $ZrO_2$), or a combination thereof. Thus, in certain embodiments, the catalytic support is made from ceria which is doped with gadolinia, which is referred to hereafter as gadolinia doped ceria (GDC), or ceria which is doped with zirconia, which is referred to hereafter as zirconia doped ceria (ZDC).

The catalyst composition also includes a catalytic component that is supported on the catalytic support. This can be any type of catalyst that is suitable for catalyzing the process in which the catalyst composition is intended for use, such as a reforming process. In certain embodiments, the catalyst is a noble metal (NM). In some particular embodiments, the catalyst is selected from platinum (Pt), palladium (Pd), rhodium (Rh), or ruthenium (Ru), either individually or in combinations of two and/or three. For example, combinations of palladium and rhodium may be preferred for some processes. Preferably, the catalyst is dispersed effectively over the entire surface of the porous structure of the catalytic support. Any suitable amount of catalyst can be used in the composition, for example, a total amount between about 0.1% and about 10% by weight of the composition.

In certain embodiments, the catalyst composition further comprises a metal oxide additive included with the catalyst that enhances or promotes the performance of the catalyst. For example, the performance of the catalyst may be enhanced in one or more of the following areas: longer dwell during steam reforming, higher hydrogen yield, higher stability, and higher sulfur tolerance and coking resistance. In some aspects of the invention, the metal oxide catalyst provides a synergistic improvement in performance. The metal oxide additive is supported on the catalytic support along with the catalyst.

Any suitable metal oxide or a combination of different metal oxides can be used as the additive. In certain embodiments, the metal oxide is selected from the group of CuO (copper oxide), NiO (nickel oxide), $Y_2O_3$ (yttrium oxide), $TiO_2$ (titanium dioxide), $SnO_2$ (tin dioxide), $MoO_3$ (molybdenum trioxide), $WO_3$ (tungsten trioxide), $V_2O_5$, (vanadium pentoxide), and any combinations thereof. The metal oxide can be used in any suitable amount, for example, an amount between about 0.5% and about 10% by weight of the catalytic support.

Figure 11:
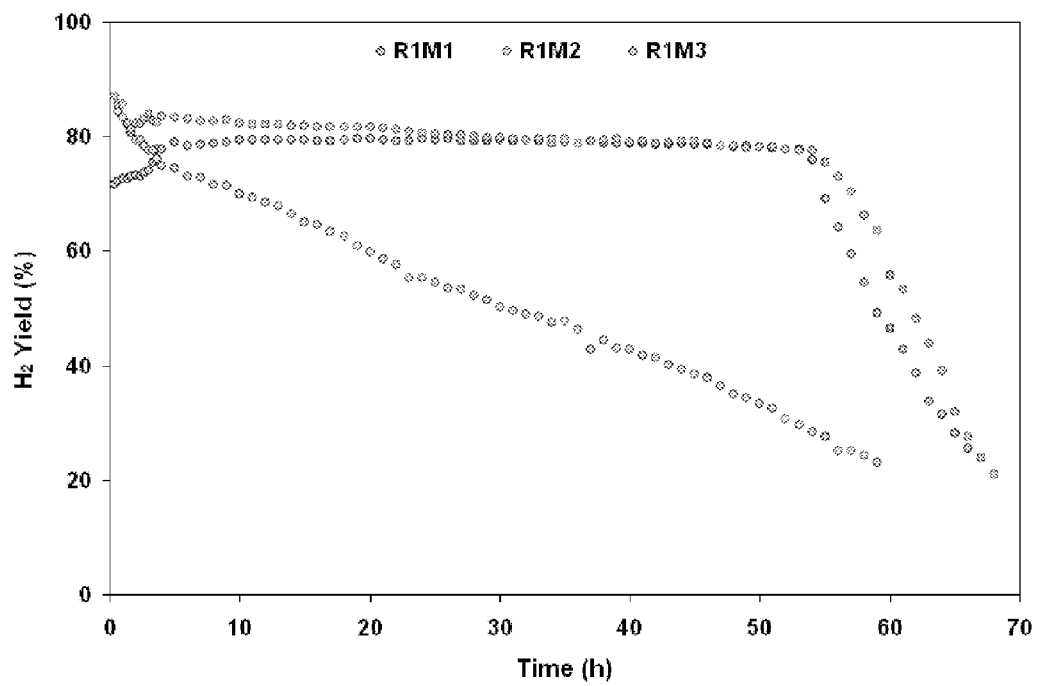
FIG. 11 is a performance graph of the mono-metal supported nanocatalysts in terms of percent hydrogen yield, when used in the reforming of kerosene (JP-8 surrogate, containing 260 ppm sulfur) at 800° C. and at atmospheric pressure.

The hydrogen yield calculated from the mole percent conversion data in the steam reforming experiment using kerosene (JP-8 surrogate, containing 260 ppm sulfur) as the fuel at 800° C. and atmospheric pressure, using single noble metal-supported catalysts is shown in FIG. 11. One of the salient features of this figure is that the initial hydrogen yield is unusually and exceptionally high (≥70%) in all the cases.

While, in one case (R1M2) the yield declines steadily, the other two compositions (R1M1 and R1M3) show remarkable stability and consistency in terms of hydrogen generation (yield ≥80%) for about ~50 h on stream. It is to be noted that this performance is with kerosene fuel without any prior desulfurization. This signifies the sulfur tolerant nature of these catalysts. In the case of R1M1 and R1M3, the decline in hydrogen takes additional ~18 h to a pre-decided level of 20%.

Figure 12:
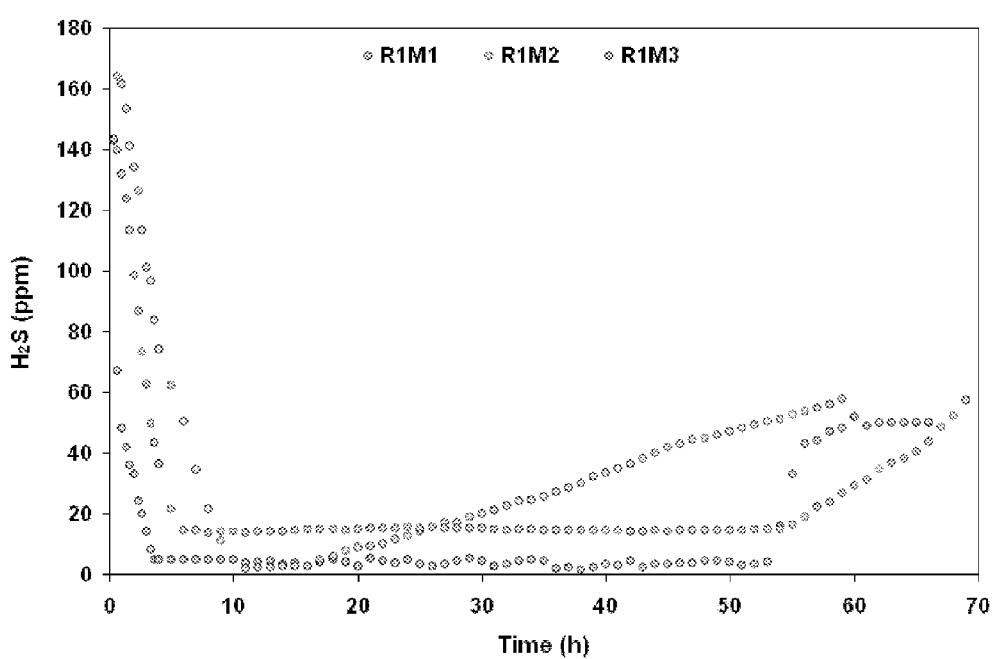
FIG. 12 is a graph showing sulfur tolerance of the mono-metal supported nanocatalysts used in the reforming of kerosene containing 260 ppm sulfur at 800° C.

This data is supported excellently by the trend in sulfur emergence as a function of time, as shown in FIG. 12 in the case of the mono-metal supported nanocatalyst formulations. In combination, these two illustrations clearly show that the poor performance of R1M2 is likely due to its sulfur intolerance, whereby it gets quickly poisoned by the sulfur present in the fuel, upon which it cannot function as an efficient reforming catalyst. As a result, the hydrogen yield consistently declines from the very early stages of the reforming process.

Figure 13:
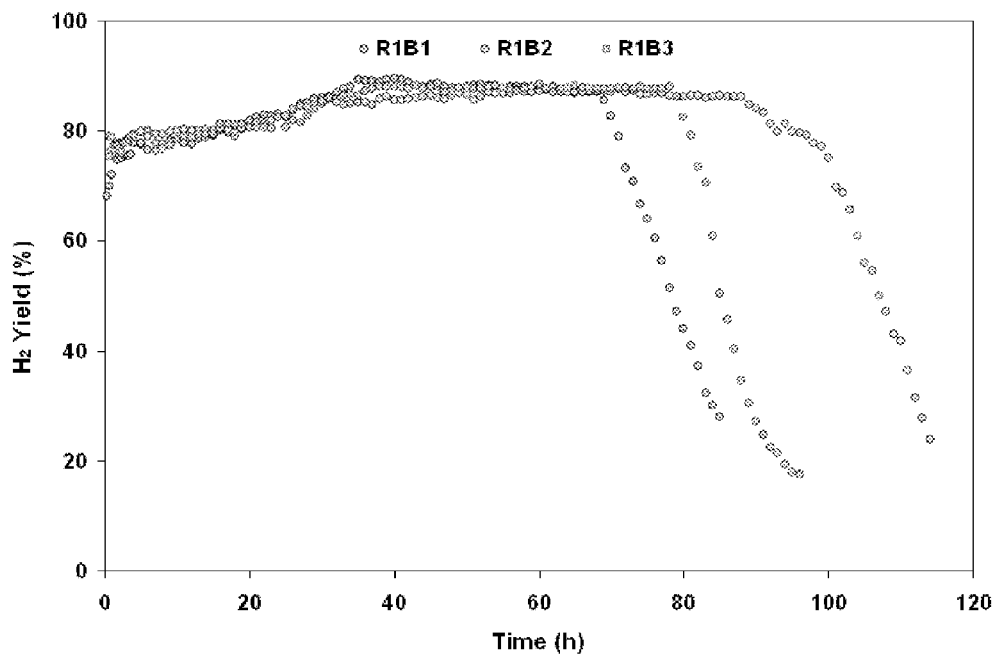
FIG. 13 is a performance graph of the bi-metal supported nanocatalysts in terms of percent hydrogen yield, when used in the reforming of kerosene (JP-8 surrogate, containing 260 ppm sulfur) at 800° C. and atmospheric pressure.

Upon replacing half of a given noble metal with another noble metal, the performance of bi-metal supported formulations is greatly improved both in terms of percent hydrogen yield as well as their longevity on-stream. This is evident from the data presented in FIG. 13.

Figure 14:
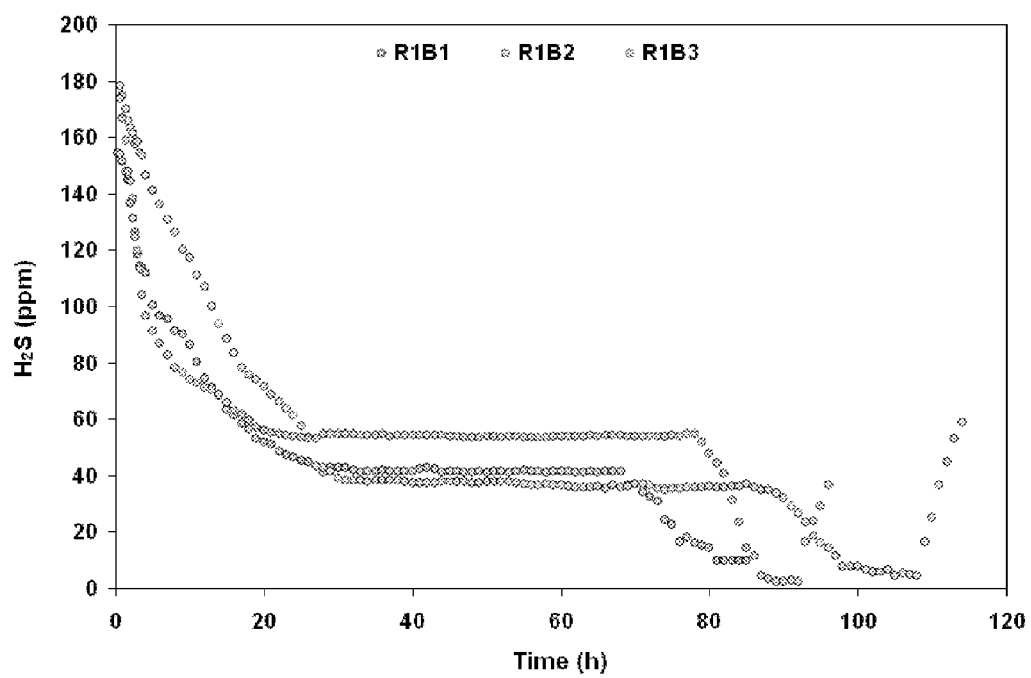
FIG. 14 is a graph showing sulfur tolerance of the bi-metal supported nanocatalysts used in the reforming of kerosene containing 260 ppm sulfur at 800° C. and atmospheric pressure.

Understandably, hydrogen yield in excess of 85% is obtained consistently for duration up to about 86 h in some cases; only after that do the bi-metallic formulations show signs of deactivation with a concomitant increase in sulfur in the exit streams, as seen in FIG. 14.

Moreover, the synergy of the second noble metal with respect to hydrogen yield as well as sulfur tolerance is very well exemplified. For instance, a combination of Rh with Ru or Pd is a better chemistry than that of Ru and Pd in the above-mentioned respects.

Figure 15:
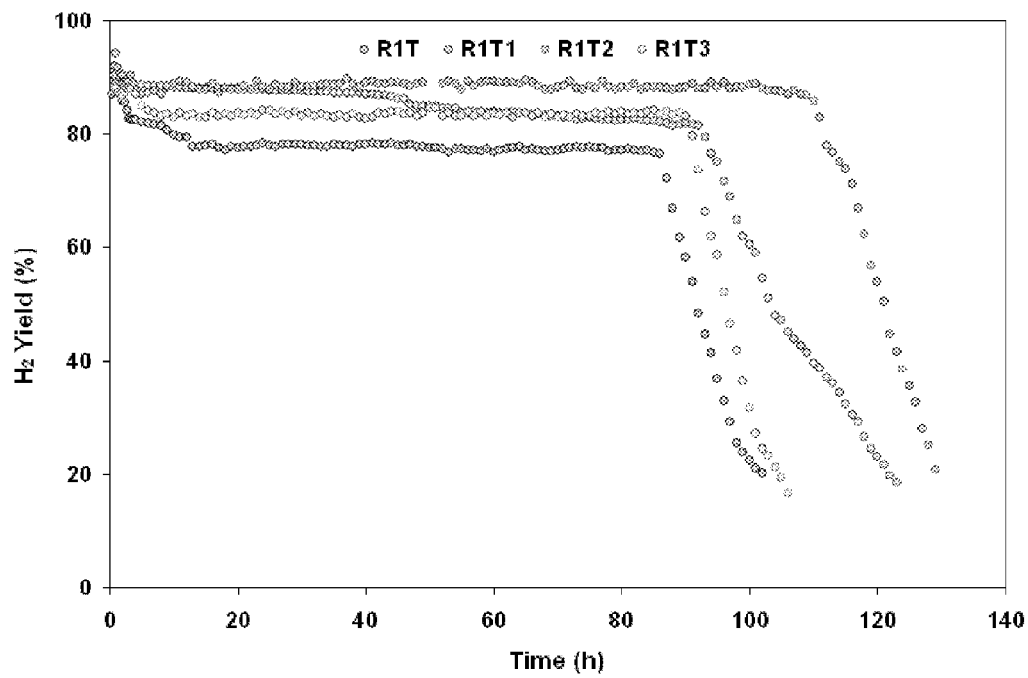
FIG. 15 is a performance graph of the tri-metal supported nanocatalysts in terms of percent hydrogen yield, when used in the reforming of kerosene (JP-8 surrogate, containing 260 ppm sulfur) at 800° C. and atmospheric pressure.
Figure 16:
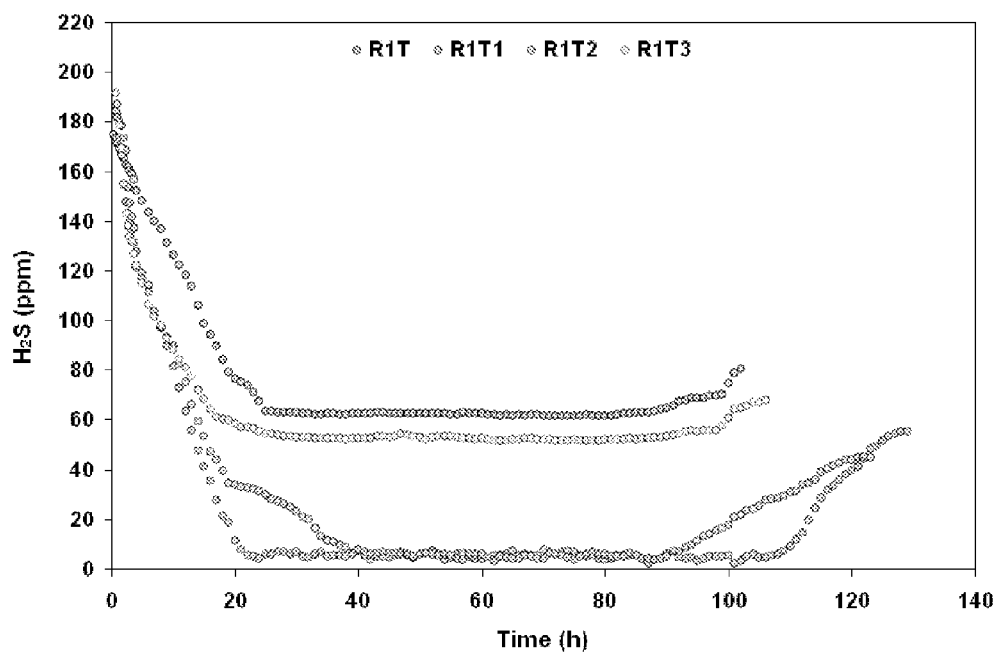
FIG. 16 is a graph showing sulfur tolerance of the tri-metal supported nanocatalysts used in the reforming of kerosene containing 260 ppm sulfur at 800° C. and atmospheric pressure.

Further improvements are manifested by using a combination of three noble metals where even better synergy is seen in terms of further improvement in hydrogen yield, longer life on stream and further enhancement in sulfur tolerance, as is evident from FIGS. 15 and 16.

FIG. 15 is a performance graph of the tri-metal supported nanocatalysts in terms of percent hydrogen yield, when used in the reforming of kerosene (JP-8 surrogate, containing 260 ppm sulfur) at 800° C. and atmospheric pressure.

FIG. 16 is a graph showing sulfur tolerance of the tri-metal supported nanocatalysts used in the reforming of kerosene containing 260 ppm sulfur at 800° C. and atmospheric pressure. Once again, the pivotal role of Rh as opposed to Pd is evident.

Also evident is the role of weight fraction of a given noble metal in these formulations. Composition R1T contains the three precious metals (Ru, Pd and Rh) in equal amount, making the total noble metal dispersion about 1 wt %. In this case, the yield is high in the beginning (~92%) which then stabilizes around ~79% in the first 24 h of reforming and stays that way for the next 60 h or so. During the same period, the sulfur in the reformate drops steadily to about 60 ppm and stays there for the next 60 h. In contrast, formulations where systematically two of the three metals are present to the extent of ½ wt % each while the fraction of the remaining third metal is ⅓ wt %, show a systematic and interesting trend in hydrogen yield as well as the sulfur in the reformate.

The catalyst composition can be made by any suitable method. In certain embodiments, the method produces a catalytic support having a high surface area and a small particle size. This can be accomplished in any suitable manner. In certain embodiments, the catalytic support is produced by a method that includes hydrothermal processing. For example, in the production of a gadolinia doped ceria (GDC) catalytic support, the salts of gadolinia and ceria are first brought into solution, and then precipitated. The precipitate is then subjected to hydrothermal processing in an autoclave, which is a high pressure-low temperature process that causes material crystallization to produce the support possessing nanocrystalline features.

To complete the production of the catalyst composition, the GDC catalytic support is brought into slurry using a suitable medium such as water or isopropanol. To the slurry are added water soluble salts of the noble metal catalyst(s). Also added to the slurry, if so desired, are salts of a metal oxide additive; for example, copper nitrate is added to produce copper oxide or yttrium nitrate is added to produce yttrium oxide and so on.

In some embodiments, the desired oxides are also added directly to the slurry and the mixture is then subjected to homogenization, where it is placed in a heated and rotated simultaneously in a water bath to cause effective mixing thereby producing a semisolid mass. This is placed in a vacuum oven and dried to a solid cake. The cake is broken up and then pulverized into a powder. The powder is then fired to produce the final catalyst composition.

In certain embodiments, the sulfur-tolerant catalyst compositions are used in a jet fuel reforming process. Thus, another aspect of the invention is a method of reforming a jet fuel which comprises subjecting a sulfur-containing jet fuel to a reforming process to produce a hydrogen-rich reformate, and catalyzing the reforming process with the sulfur-tolerant catalyst composition or with the composite catalyst and sorbent composition.

The method can be used to reform any type of jet fuel or mixtures of different jet fuels, for example, jet fuels such as JP-8 and Jet-A. Jet-A fuel ($C_{11.8}H_{22.2}$, close to dicycloparaffins) is very similar to diesel and JP-8 is quite similar to kerosene in its sulfur content and other characteristics. Thus, it is expected that other types of jet fuels, such as those used on international flights, could be reformed using the same or slightly modified catalysts and desulfurizers. The formulations contained in these embodiments can also be used for deriving sulfur-free hydrogen-rich reformate from diesel fuel and gasified coal.

The catalyst compositions of the invention can be employed in combination with any other suitable devices/structures to facilitate their use in particular processes. For example, devices/structures used in a typical steam reforming process are well known.

In order that the nature of the compositions and the methods described herein may be more clearly understood, preferred forms thereof will now be described by reference to the following experimental results. The composition of the catalysts and the desulfurizers encompassed by this invention, some of which are referred to in the examples below, is shown below in Table 1 through Table 4, where, GDC is gadolinia doped ceria and ZDC is zirconia doped ceria.

TABLE 1

| Sample | Composition (wt %) | Sample | Composition |
|---|---|---|---|
| 1GX | GDC + 0.5% Rh + 0.5% Pd, 6% NiO | 2GX | ZDC + 0.5% Rh + 0.5% Pd, 6% NiO |
| 1GAu | GDC + 1% Au | 2GAu | ZDC + 1% Au |
| R1M1 | GDC + 1% Ru | R2M1 | ZDC + 1% Ru |
| R1M2 | GDC + 1% Pd | R2M2 | ZDC + 1% Pd |
| R1M3 | GDC + 1% Rh | R2M3 | ZDC + 1% Rh |
| R1B1 | GDC + 0.5% Ru + 0.5% Pd | R2B1 | ZDC + 0.5% Ru + 0.5% Pd |
| R1B2 | GDC + 0.5% Ru + 0.5% Rh | R2B2 | ZDC + 0.5% Ru + 0.5% Rh |
| R1B3 | GDC + 0.5% Pd + 0.5% Rh | R2B3 | ZDC + 0.5% Pd + 0.5% Rh |
| R1T | GDC + 0.33% Ru + 0.33% Pd + 0.33% Rh | R2T | GDC + 0.33% Ru + 0.33% Pd + 0.33% Rh |
| R1T1 | GDC + 0.33% Ru + 0.5% Pd + 0.5% Rh | R2T1 | ZDC + 0.33% Ru + 0.5% Pd + 0.5% Rh |
| R1T2 | GDC + 0.5% Ru + 0.33% Pd + 0.5% Rh | R2T2 | ZDC + 0.5% Ru + 0.33% Pd + 0.5% Rh |
| R1T3 | GDC + 0.5% Ru + 0.5% Pd + 0.33% Rh | R2T3 | ZDC + 0.5% Ru + 0.5% Pd + 0.33% Rh |

TABLE 2

| Sample | Composition (wt %) | Sample | Composition |
|---|---|---|---|
| R1M1T | GDC + 1% Ru + 5% $TiO_2$ | R2M1T | ZDC + 1% Ru + 5% $TiO_2$ |
| R1M2T | GDC + 1% Pd + 5% $TiO_2$ | R2M2T | ZDC + 1% Pd + 5% $TiO_2$ |
| R1M3T | GDC + 1% Rh + 5% $TiO_2$ | R2M3T | ZDC + 1% Rh + 5% $TiO_2$ |
| R1M1Y | GDC + 1% Ru + 5% $Y_2O_3$ | R2M1Y | ZDC + 1% Ru + 5% $Y_2O_3$ |
| R1M2Y | GDC + 1% Pd + 5% $Y_2O_3$ | R2M2Y | ZDC + 1% Pd + 5% $Y_2O_3$ |
| R1M3Y | GDC + 1% Rh + 5% $Y_2O_3$ | R2M3Y | ZDC + 1% Rh + 5% $Y_2O_3$ |
| R1M2C | GDC + 1% Pd + 5% CuO | R2M2C | ZDC + 1% Pd + 5% CuO |
| R1M3C | GDC + 1% Rh + 5% CuO | R2M3C | ZDC + 1% Rh + 5% CuO |
| R1M1CY | GDC + 1% Ru + 2.5% CuO + 2.5% $Y_2O_3$ | R2M1CY | ZDC + 1% Ru 2.5% CuO + 2.5% $Y_2O_3$ |
| R1M2CY | GDC + 1% Pd + 2.5% CuO + 2.5% $Y_2O_3$ | R2M2CY | ZDC + 1% Pd + 2.5% CuO + 2.5% $Y_2O_3$ |
| R1M3CY | GDC + 1% Rh + 2.5% CuO + 2.5% $Y_2O_3$ | R2M3CY | ZDC + 1% Rh + 2.5% CuO + 2.5% $Y_2O_3$ |
| R1M1TM | GDC + 1% Ru + 4.5% $TiO_2$ + 0.5% $MoO_3$ | R2M1TM | ZDC + 1% Ru + 4.5% $TiO_2$ + 0.5% $MoO_3$ |
| R1M2TM | GDC + 1% Pd + 4.5% $TiO_2$ + 0.5% $MoO_3$ | R2M2TM | ZDC + 1% Pd + 4.5% $TiO_2$ + 0.5% $MoO_3$ |
| R1M3TM | GDC + 1% Rh + 4.5% $TiO_2$ + 0.5% $MoO_3$ | R2M3TM | ZDC + 1% Rh + 4.5% $TiO_2$ + 0.5% $MoO_3$ |

TABLE 3

| Sample | Composition (wt %) | Sample | Composition |
|---|---|---|---|
| R1B1T | GDC + 0.5% Ru + 0.5% Pd + 5% $TiO_2$ | R2B1T | ZDC + 0.5% Ru + 0.5% Pd + 5% $TiO_2$ |
| R1B2T | GDC + 0.5% Ru + 0.5% Rh + 5% $TiO_2$ | R2B2T | ZDC + 0.5% Ru + 0.5% Rh + 5% $TiO_2$ |
| R1B3T | GDC + 0.5% Pd + 0.5% Rh + 5% $TiO_2$ | R2B3T | ZDC + 0.5% Pd + 0.5% Rh + 5% $TiO_2$ |
| R1B1Y | GDC + 0.5% Ru + 0.5% Pd + 5% $Y_2O_3$ | R2B1Y | ZDC + 0.5% Ru + 0.5% Pd + 5% $Y_2O_3$ |
| R1B2Y | GDC + 0.5% Ru + 0.5% Rh + 5% $Y_2O_3$ | R2B2Y | ZDC + 0.5% Ru + 0.5% Rh + 5% $Y_2O_3$ |
| R1B3Y | GDC + 0.5% Pd + 0.5% Rh + 5% $Y_2O_3$ | R2B3Y | ZDC + 0.5% Pd + 0.5% Rh + 5% $Y_2O_3$ |
| R1B1C | GDC + 0.5% Ru + 0.5% Pd + 5% CuO | R2B1C | ZDC + 0.5% Ru + 0.5% Pd + 5% CuO |
| R1B2C | GDC + 0.5% Ru + 0.5% Rh + 5% CuO | R2B2C | ZDC + 0.5% Ru + 0.5% Rh + 5% CuO |
| R1B3C | GDC + 0.5% Pd + 0.5% Rh + 5% CuO | R2B3C | ZDC + 0.5% Pd + 0.5% Rh + 5% CuO |
| R1B1TY | GDC + 0.5% Ru + 0.5% Pd + 2.5% $TiO_2$ + 2.5 $Y_2O_3$ | R2B1TY | ZDC + 0.5% Ru + 0.5% Pd + 2.5% $TiO_2$ + 2.5 $Y_2O_3$ |
| R1B2TY | GDC + 0.5% Ru + 0.5% Rh + 2.5% $TiO_2$ + 2.5 $Y_2O_3$ | R2B2TY | ZDC + 0.5% Ru + 0.5% Rh + 2.5% $TiO_2$ + 2.5 $Y_2O_3$ |
| R1B3TY | GDC + 0.5% Pd + 0.5% Rh + 2.5% $TiO_2$ + 2.5 $Y_2O_3$ | R2B3TY | ZDC + 0.5% Pd + 0.5% Rh + 2.5% $TiO_2$ + 2.5 $Y_2O_3$ |
| R1B1CY | GDC + 0.5% Ru + 0.5% Pd + 2.5% CuO + 2.5 $Y_2O_3$ | R2B1CY | ZDC + 0.5% Ru + 0.5% Pd + 2.5% CuO + 2.5 $Y_2O_3$ |
| R1B2CY | GDC + 0.5% Ru + 0.5% Rh + 2.5% CuO + 2.5 $Y_2O_3$ | R2B2CY | ZDC + 0.5% Ru + 0.5% Rh + 2.5% CuO + 2.5 $Y_2O_3$ |
| R1B3CY | GDC + 0.5% Pd + 0.5% Rh + 2.5% CuO + 2.5 $Y_2O_3$ | R2B3CY | ZDC + 0.5% Pd + 0.5% Rh 2.5% CuO + 2.5 $Y_2O_3$ |
| R1B1TM | GDC + 0.5% Ru + 0.5% Pd + 4.5% $TiO_2$ + 0.5 $MoO_3$ | R2B1TM | ZDC + 0.5% Ru + 0.5% Pd + 4.5% $TiO_2$ + 0.5 $MoO_3$ |
| R1B2TM | GDC + 0.5% Ru + 0.5% Rh + 4.5% $TiO_2$ + 0.5 $MoO_3$ | R2B2TM | ZDC + 0.5% Ru + 0.5% Rh + 4.5% $TiO_2$ + 0.5 $MoO_3$ |
| R1B3TM | GDC + 0.5% Pd + 0.5% Rh + 4.5% $TiO_2$ + 0.5 $MoO_3$ | R2B3TM | ZDC + 0.5% Pd + 0.5% Rh + 4.5% $TiO_2$ + 0.5 $MoO_3$ |
| R1B3YM | GDC + 0.5% Pd + 0.5% Rh + 4.5% $Y_2O_3$ + 0.5 $MoO_3$ | R2B3YM | ZDC + 0.5% Pd + 0.5% Rh + 4.5% $Y_2O_3$ + 0.5 $MoO_3$ |

TABLE 4

| Sample | Composition (wt %) | Sample | Composition |
|---|---|---|---|
| R1TT | GDC + 0.33% Ru + 0.33% Pd + 0.33% Rh + 5% $TiO_2$ | R2TT | ZDC + 0.33% Ru + 0.33% Pd + 0.33% Rh + 5% $TiO_2$ |
| R1TY | GDC + 0.33% Ru + 0.33% Pd + 0.33% Rh + 5% $Y_2O_3$ | R2TY | ZDC + 0.33% Ru + 0.33% Pd + 0.33% Rh + 5% $Y_2O_3$ |
| R1TC | GDC + 0.33% Ru + 0.33% Pd + 0.33% Rh + 5% CuO | R2TC | ZDC + 0.33% Ru + 0.33% Pd + 0.33% Rh + 5% CuO |
| R1TTY | GDC + 0.33% Ru + 0.33% Pd + 0.33% Rh + 2.5% $TiO_2$ + 2.5 $Y_2O_3$ | R2TTY | ZDC + 0.33% Ru + 0.33% Pd + 0.33% Rh + 2.5% $TiO_2$ + 2.5 $Y_2O_3$ |
| R1TCY | GDC + 0.33% Ru + 0.33% Pd + 0.33% Rh + 2.5% CuO + 2.5 $Y_2O_3$ | R2TT | ZDC + 0.33% Ru + 0.33% Pd + 0.33% Rh + 2.5% CuO + 2.5 $Y_2O_3$ |
| R1TTM | GDC + 0.33% Ru + 0.33% Pd + 0.33% Rh + 4.5% $TiO_2$ + 0.5 $MoO_3$ | R2TTM | ZDC + 0.33% Ru + 0.33% Pd + 0.33% Rh + 4.5% $TiO_2$ + 0.5 $MoO_3$ |
| R1TYM | GDC + 0.33% Ru + 0.33% Pd + 0.33% Rh + 4.5% $Y_2O_3$ + 0.5 $MoO_3$ | R2TYM | ZDC + 0.33% Ru + 0.33% Pd + 0.33% Rh + 4.5% $Y_2O_3$ + 0.5 $MoO_3$ |

The preparation of agile sulfur sorbents using two light-weight inert supports, viz., clinoptilolite and diatomite has been described above. Examples of desulfurizer formulations developed in this invention are given in Table 5.

TABLE 5

| Clinoptilolite-based Desulfurizer | | Diatomite--based Desulfurizer | |
|---|---|---|---|
| Sample | Composition | Sample | Composition |
| 3C1 | Clinoptilolite + 5% Nano Fe | 3D1 | Diatomite + 5% Nano Fe |
| 3C2 | Clinoptilolite + 5% Nano Cu | 3D2 | Diatomite + 5% Nano Cu |
| 3C3 | Clinoptilolite + 5% Nano Ni | 3D3 | Diatomite + 5% Nano Ni |
| 3C4 | Clinoptilolite + 5% $Bi_2O_3$ | 3D4 | Diatomite + 5% $Bi_2O_3$ |
| 3C5 | Clinoptilolite + 1% Nano Au | 3D5 | Clinoptilolite + 1% Nano Au |

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

References

The publication and other material used herein to illuminate the invention or provide additional details respecting the practice of the invention, are incorporated as reference herein, and for convenience are provided in the following bibliography.

Citation of the any of the documents recited herein is not intended as an admission that any of the foregoing is pertinent prior art. All statements as to the date or representation as to the contents of these documents is based on the information available to the applicant and does not constitute any admission as to the correctness of the dates or contents of these documents.

1. A. Hutchinson, "Portable fuel cell runs on military jet fuel to power diesel trucks," *Popular Mechanics*, Dec. 12, 2007; fuelcellsworks.com/Supppage8217.
2. W. A. Whittenberger, U.S. Pat. No. 6,920,920 (2005).
3. A.-M. Azad and M. A. Abraham, "High performance reforming catalysts with in-situ desulfurization capability for jet fuels," Final Report, NASA GRC-funded project, grant #NNC04GB44G (July 2006).
4. A.-M. Azad and M. A. Abraham, "Novel formulations of sulfur-tolerant catalysts and their synthesis," US patent application filed (Feb. 21, 2008).
5. A.-M. Azad and Martin Duran, "Development of ceria-supported sulfur tolerant nanocatalysts: Rh-based formulations," *Applied Catalysis A: General*, 330 (2007) 77-88.
6. A.-M. Azad, Martin Duran, Amanda McCoy and Martin Abraham, "Development of ceria-supported sulfur tolerant nanocatalysts: Pd-based formulations," *Applied Catalysis A: General*, 332 (2007) 225-236.
7. A. McCoy, M. Duran, A.-M. Azad, S. Chattopadhyay and M. Abraham, "Performance of sulfur tolerant reforming catalysts for production of hydrogen from jet fuel simulants," *Energy and Fuels*, 21 (2007) 3513-3519.
8. A.-M. Azad, "You'll wonder where the yellow went," *Aerospace & Defense Manufacturing* 2008 *Yearbook*, Society of Manufacturing Engineering, Dearborn, Mich., (2008) pp. 183-185.
9. A.-M. Azad, "The Gradiator™: A novel functionally-gradient logistic fuel reformer module," *The American Ceramic Society Bulletin*, 32 (2008) 32-34.
10. A.-M. Azad, "High Temperature Sulfur Sorbents," Invention disclosure filed (Nov. 13, 2008).
11. A.-M. Azad, "Z-Series High Temperature Sulfur Sorbents," Invention disclosure filed (Nov. 14, 2008).

What is claimed is:

1. A desulfurizer-reformer reactor system comprising a desulfurizing material comprising one or more thermally and microstructurally stable metal oxides dispersed on an inert support, and a sulfur-tolerant reforming catalyst material arranged as a gradient assembly,
   wherein the desulfurizing material and/or the reforming catalyst material are configured to be regenerable using an oxidation process;
   the gradient assembly comprising:
   i) a first chamber containing a nanoporous matrix having dispersed thereon the desulfurizing material,
   the first chamber being configured for receiving a sulfur-laden fuel mixture, such that the sulfur-laden fuel mixture, when brought into contact with the desulfurizing material, is substantially denuded of sulfur-bearing species in an exothermic reaction; and
   ii) a second chamber containing a nanoscale high-surface area ceramic support having dispersed thereon the sulfur-tolerant reforming catalyst material, wherein the reforming catalyst material comprises ceria nominally doped with $Gd_2O_3$ or $ZrO_2$:
   the second chamber being configured for receiving the fuel mixture from the first chamber, such that the sulfur-tolerant reforming catalyst material removes additional sulfur in the fuel mixture in an endothermic reaction sufficient to provide a sulfur-free, hydrogen-rich fuel mixture;
   wherein the first chamber and the second chamber are concentric chambers; and
   wherein the first chamber containing the desulfurizing material is separated from the second chamber containing the reforming catalyst material by a heat exchangeable metal or alloy.

2. The reactor system of claim 1, wherein the gradient assembly is configured to allow heat generated in the desulfurizing chamber to be radiated to the reforming catalyst material.

3. The reactor system of claim 1, wherein the sulfur-laden fuel and the resulting desulfurized fuel flow through the desulfurizing material and the reforming catalyst material in substantially opposite directions.

4. The reactor system of claim 1, wherein the reforming catalyst material comprises at least one noble metal catalyst and, optionally, a promoter oxide additive.

5. The reactor system of claim 1, wherein the reforming catalyst material comprises a noble metal-supported on a nanoscale matrix.

6. The reactor system of claim 1, wherein the inert support comprises one or more of: diatomaceous type materials, zeolitic-type natural clay, zeolitic-type natural clay with angstrom-sized pores, and high periodicity nanoporous biomimetic materials.

7. The reactor system of claim 1, wherein the desulfurizing material includes a zeolitic-type lightweight inert support.

8. The reactor system of claim 7, wherein the desulfurizing material comprises a lightweight zeolitic-type mineral belonging to the family of aluminosilicates.

9. The reactor system of claim 1, wherein the desulfurizing material and the reforming catalyst material are coated onto metallic screens and/or ceramic monolithic honeycombs.

10. The reactor system of claim 1, wherein the reforming catalyst material comprises a noble metal-supported nanoscale matrix, where the matrix is cerium dioxide ($CeO_2$).

* * * * *